(12) United States Patent
Schuchman et al.

(10) Patent No.: US 9,785,413 B2
(45) Date of Patent: Oct. 10, 2017

(54) METHODS AND APPARATUS TO ELIMINATE PARTIAL-REDUNDANT VECTOR LOADS

(71) Applicant: Intel Corporation, Santa Clara, CA (US)

(72) Inventors: Farhana Aleen Schuchman, Santa Clara, CA (US); David L. Kreitzer, Manassas, VA (US); Rakesh Krishnaiyer, Milpitas, CA (US); Vyacheslav Pavlovich Zakharin, Berdsk (RU); Sergey Preis, Novosibirsk (RU); Leonardo Jose Borges, Houston, TX (US); Philippe Thierry, Igny (FR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/741,160

(22) Filed: Jun. 16, 2015

(65) Prior Publication Data

US 2016/0259628 A1    Sep. 8, 2016

Related U.S. Application Data

(60) Provisional application No. 62/129,752, filed on Mar. 6, 2015.

(51) Int. Cl.
*G06F 9/45* (2006.01)
*G06F 9/44* (2006.01)
*G06F 11/36* (2006.01)

(52) U.S. Cl.
CPC .............. *G06F 8/30* (2013.01); *G06F 8/4441* (2013.01); *G06F 8/452* (2013.01); *G06F 11/3688* (2013.01)

(58) Field of Classification Search
None
See application file for complete search history.

(56) References Cited

U.S. PATENT DOCUMENTS

| 2004/0015931 | A1* | 1/2004 | Larin | G06F 8/447 717/158 |
| 2005/0278713 | A1* | 12/2005 | Goodwin | G06F 8/447 717/151 |

(Continued)

OTHER PUBLICATIONS

Locktyukhin et al., "Improving the Performance of the Secure Hash Algorithim (SHA-1), Parallelization can make a difference," retrieved from <http://www.drdobbs.com/go-parallel/article/print?articleId=224202549>, Apr. 12, 2010, 10 pages.

(Continued)

*Primary Examiner* — Daxin Wu
(74) *Attorney, Agent, or Firm* — Hanley, Flight & Zimmerman, LLC

(57) ABSTRACT

Methods, apparatus, systems and articles of manufacture are disclosed to eliminate partial-redundant vector loads. An example apparatus includes a node group to associate a vector operation with a node group based on a load type of the vector operation. The example apparatus also includes a candidate identifier to identify a candidate in the node group, the candidate to include a subset of vector operations of the node group. The example apparatus also includes a code optimizer to determine replacement code based on a characteristic of the candidate, and to compare an estimated cost associated with executing the replacement code to a threshold cost relative to a cost of executing the candidate. The example apparatus also includes a code generator to generate machine code using the replacement code when the estimated cost of executing the replacement code satisfies the threshold cost.

18 Claims, 12 Drawing Sheets

(56) References Cited

U.S. PATENT DOCUMENTS

| | | | | |
|---|---|---|---|---|
| 2007/0156990 A1* | 7/2007 | Hammarlund | ...... | G06F 9/30043 711/167 |
| 2009/0070607 A1* | 3/2009 | Safford | ................ | G06F 1/3234 713/320 |
| 2012/0066310 A1* | 3/2012 | Archer | ................ | G06F 15/8092 709/205 |
| 2015/0286472 A1* | 10/2015 | Lim | ........................ | G06F 8/443 717/151 |
| 2015/0317137 A1* | 11/2015 | Amiri | ..................... | G06F 8/456 717/154 |

OTHER PUBLICATIONS

Zakharin, "Gathers to Shuffles optimization in PCG," Mar. 25, 2014, Intel Corporation, 16 pages.

* cited by examiner

| Candidate Identifier (905) | Vector Load Kind (910) | Data Type (915) | Vector Size (920) | CPU Architecture (925) | Replacement Code (930) |
|---|---|---|---|---|---|
| 0011 | Unit-Stride Load | Integer | 2 | Arch-1 | Val1 = V_Load(A[i])<br>Val3 = V)_Load(A[i+2])<br>Val2 = (V)PALIGNR(Val3, Val1, 1) |
| 0012 | Unit-Stride Load | Floating Point | 4 | Arch-2 | N/A |
| ... | ... | ... | ... | ... | ... |
| 0021 | Gather Load | Integer | 3 | Arch-1 | N/A |
| ... | ... | ... | ... | ... | ... |

950 → row 0011
960 → row 0012
970 → row 0021

Replacement Code Based on Characteristics of a Replacement Candidate

FIG. 9

METHODS AND APPARATUS TO ELIMINATE PARTIAL-REDUNDANT VECTOR LOADS

RELATED APPLICATION

This patent claims the benefit of U.S. Provisional Patent Application Ser. No. 62/129,752, filed on Mar. 6, 2015, which is hereby incorporated by reference in its entirety.

FIELD OF THE DISCLOSURE

This disclosure relates generally to compiler optimization, and, more particularly, to methods and apparatus to eliminate partial-redundant vector loads.

BACKGROUND

Today's general purpose microprocessors are highly parallel processors with different levels of parallelism. In computer science, the process of converting an algorithm from a scalar implementation, which performs an operation on a single operand, to a vector implementation in which a single instruction refers to a vector (e.g., where it performs a single instruction on a set of operands) is called vectorization. Single-instruction, multiple-data (SIMD) instructions operate on multiple data elements in one instruction and make use of processor registers. By processing multiple data elements in parallel, vectorization provides a convenient way to utilize data parallelism in scientific, engineering, or graphical applications that apply a single operation to all elements in a data set, such as a vector or matrix.

Programmers can exploit vectorization to speedup certain parts of their code. If vectorization is enabled, a compiler may use additional registers to perform more than one operation (e.g., memory loads, additions, etc.) in a single instruction. Vectorization may be especially useful in improving loop execution performance.

BRIEF DESCRIPTION OF THE DRAWINGS

FIG. 9 illustrates an example data table that may be stored by the example vectorization optimizer of FIGS. 1 and/or 2 to store replacement code.

DETAILED DESCRIPTION

Figure 1:
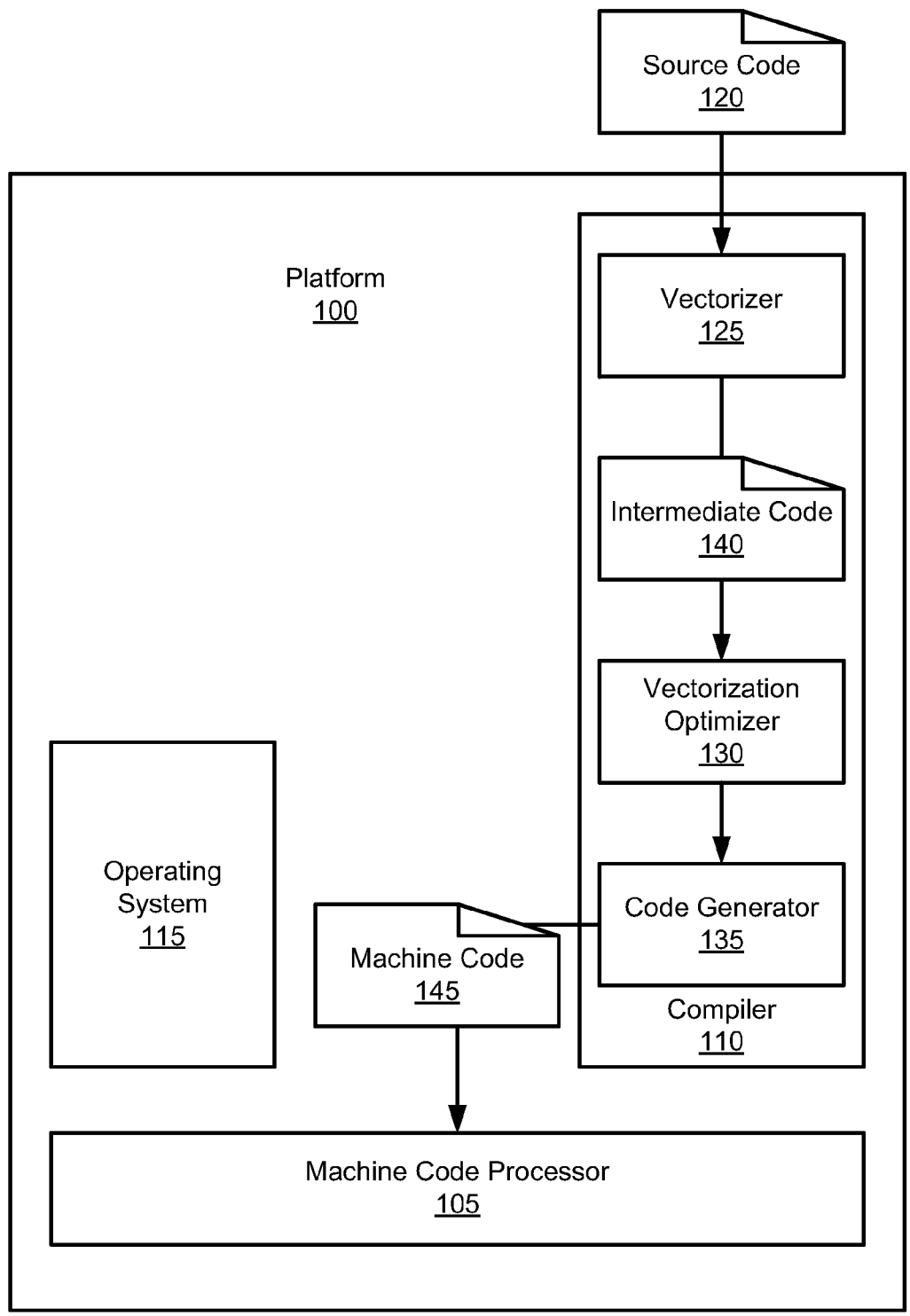
FIG. 1 is an example illustration of an example platform constructed in accordance with the teachings of this disclosure to eliminate partial-redundant vector loads.

Partial redundancy elimination (PRE) is a compiler optimization technique that can be applied to scalar code and vector code of a program. When applied to vector code, PRE can eliminate fully-redundant vector operations (e.g., when all elements of corresponding vector operations overlap). However, some programs may include vector operations where only a portion of the elements of a vector operation overlap with elements of another vector operation. In some such instances, PRE cannot completely eliminate the corresponding vector operations and, thus, the program includes vector operations that access overlapping elements (e.g., partial-redundant vector operations).

A class of algorithms that commonly exhibit partial overlapping of vectors is known as stencil code (or stencil computations). Stencil code may be used in a variety of scientific and engineering applications such as computational electromagnetics, image processing and/or partial differential equation solvers. Stencil code is readily expressible as a loop, in which the corresponding algorithm updates array elements according to a pattern using neighboring elements (e.g., elements neighboring in time, space, etc.). Often, the neighboring elements examined in one step of the computation will overlap with neighboring elements examined in a previous or subsequent iteration of the loop. In vector code, any elements in a vector that correspond to an overlapped neighbor will result in that element being redundantly loaded.

Example methods and apparatus disclosed herein automate compiler optimization by detecting and removing cases of partial redundancy in vectorized code (e.g., vector elements), thus improving the performance efficiency of the vectorized code even further. Although example methods and apparatus disclosed herein reference a case with a stride of one element (e.g., a unit-stride case), the more complex vectorized stencil codes that use non-unit-stride loads and even gather loads may additionally or alternatively be used.

Example methods and apparatus disclosed herein eliminate groups (or clusters) of partial-redundant vector loads with a smaller set of non-redundant vector loads or reduced-redundant vector loads. Furthermore, example methods and apparatus disclosed herein provide a general solution for removing different types of partially overlapping vector loads such as gather loads, stride loads and/or non-stride loads. Disclosed examples (1) detect a group of partially overlapping vector loads (e.g., vectorized load operations where the group of vector loads have overlapping (e.g., common) elements) and (2) generate relatively more optimized code to replace the detected group of partially overlapping vector loads. For example, the group of partially overlapping vector loads (e.g., partial-redundant vector loads) may be replaced with a minimum number of vector loads so that each element in the group of partially overlapping vector loads is loaded once and the vectors with the overlapping elements are computed with simple register operations instead of performing partial-redundant loads.

The examples disclosed herein identify groups of partial-redundant vector loads that are candidates for replacement based on whether or not the partial-redundant vector loads satisfy one or more dependencies test(s). Disclosed examples parse vector operations output by a vectorizer and group the vector operations together based on common (or shared) characteristics such as vector load type and base address of the vector operations. For example, a node grouper may create a first group of vector operations (e.g., a first node group) including vector loads that are of a first vector load type (e.g., unit-stride loads) and that index their respective vector elements with a first base address (e.g., a[i]), may create a second group of vector operations (e.g., a second node group) including vector loads that are of a second vector load type (e.g., gather loads) and that index their respective vector elements with a second base address (e.g., b[i]), and may create a third group of vector operations (e.g., a third node group) including vector loads that are of a third vector load type (e.g., non-unit stride loads) and that index their respective vector elements with the first base address (e.g., a[i]). Once grouped, the vector operations of the respective node groups are candidates for replacing with relatively more efficient code (e.g., may be replaced with a cheaper and/or faster set of vector operations).

In some examples, the vector operations included in a node group may be further processed in view of transformation limitations imposed by a candidate identifier. For example, transformation limitations may include vector size, a threshold number of nodes and/or the distance between the vector elements of a vector load. For example, a group that includes four nodes may be split into two optimization candidates if a code optimizer is limited to only processing two nodes at a time. In some such examples, the nodes in the node group may be split based on distance from a center address. For example, the distance from the center for each node in the group may be computed from the address of the first node in the group. For example, a stencil code may access memory addresses a[i−2], a[i−1], a[i], a[i+1], and a[i+2]. In such instances, the center for the nodes of the group (e.g., a[i−2], . . . a[i+2]) is a[i]. The distance from the center for the first node of the group (e.g., a[i−2]) is −2, the distance from the center for the second node of the group (e.g., a[i−1]) is −1, the distance from the center for the third node of the group (e.g., a[i]) is 0, the distance from the center for the fourth node of the group (e.g., a[i+1]) is +1, and the distance from the center for the fifth node of the group (e.g., a[i+2]) is +2. The candidate identifier may then split the four nodes of the group into separate optimization candidates based on their respective distances (e.g., the two nodes with the shortest distance (e.g., the two closest neighbors) form one optimization candidate and the other two nodes form another optimization candidate).

The example methods and apparatus disclosed herein determine the one or more optimization candidates (e.g., group of vector operations that are candidates for replacement) once all the vector operations in the program (e.g., the source code) have been vectorized (e.g., the vectorizer stops outputting vector operations). The example methods and apparatus disclosed herein perform memory disambiguation on the nodes of the optimization candidate to verify that there are no intervening write/store operations to the memory addresses accessed by the vector operations (e.g., the vector elements). For example, because the position of vector load operations may change during vectorization, contention between one or more of the vector elements may exist. In some such examples, if an optimization candidate fails the dependencies test (e.g., an intervening write/store operation is detected), no optimization process is performed on the optimization candidate (e.g., the vector operations of the candidate are executed) and the next optimization candidate, if any, is processed.

When an optimization candidate is identified and is determined to satisfy the dependencies test, the example methods and apparatus disclosed herein use characteristics of the optimization candidate to generate replacement vector operations that can be performed instead of the original vector loads grouped in the optimization candidate. Characteristics of the optimization candidate include vector load type, vector size, element type, result mask, stride, architecture, etc. Additionally, the example methods and apparatus disclosed herein select whether to provide the original vector loads or the replacement vector operations to a code generator based on a comparison of the cost of performing the original vector loads to the cost of performing the replacement vector operations.

As disclosed herein, the replacement vector operations are a group of vector operations that reduce the number of memory accesses by using register operations instead of memory accesses. For example, the replacement vector operations may include a (V)PALIGN* instruction that concatenates the elements of two vectors, shifts the elements right and returns the lower half of the concatenated vector, which may have spanned both of the original vectors. In some such instances, the (V)PALIGN* instruction includes no memory access requests and, therefore, the (V)PALIGN* instruction is more cost effective than a vector load because the (V)PALIGN* instruction has shorter latencies than memory access operations, and the reduced number of memory operations reduces contention (e.g., conflicts arising from shared access to elements) on the memory system. Other example replacement vector operations that may be used to reduce the number of memory accesses include SHIFT operations, ADD operations, etc.

FIG. 1 is a schematic illustration of an example platform 100 that may be used with the methods and apparatus described herein. In the illustrated example of FIG. 1, the platform 100 includes a machine code processor 105, a compiler 110 and an operating system 115. In the illustrated example of FIG. 1, example source code 120 (e.g., a program) is external to the platform 100 (e.g., a target computer system), but may be stored in an external memory, a memory within the example platform 100 and/or received directly from an intranet network (wired, wireless, etc.) and/or the Internet.

In operation, the example operating system 115 may host an environment to execute one or more portions of the source code 120. The example compiler 110 compiles the source code 120 to generate native and/or machine code 145 that may be executed by the example machine code processor 105. In the illustrated example of FIG. 1, the example compiler 110 includes a vectorizer 125, a vectorization optimizer 130 and a code generator 135.

The example vectorizer 125 of FIG. 1 vectorizes the source code 120 and outputs intermediate code 140. Vectorization is a process by which a program (e.g., the source code 120) is converted from a scalar implementation to a vector implementation. Executing scalar code processes a single operand at a time. In contrast, executing vector code processes one operation on multiple sets of operands at once. The example vectorizer 125 identifies successive scalar operations in the source code 120 and transforms the successive scalar operations into equivalent parallel operations (i.e., it vectorizes the scalar code). The vector size (sometimes referred to as "vector length") of a vector operation indicates the number of elements (e.g., data elements) that are included in the vector. For example, a vector operation, with a vector size of eight, can be used to replace eight parallel operations with a single instruction.

Similar to scalar operations, the vector operations output by the example vectorizer 125 as intermediate code 140 have vector types. A vector type is a derived data type to represent a vector of elements (e.g., multiple elements). To this end, a vector type is defined by (1) an underlying primitive data type (e.g., element type such as integer, floating-point, etc.) and (2) a vector size (e.g., a number of elements included in the vector). Thus, for example, a vector operation of vector type "F32-V128" is a 128-bit vector of four 32-bit floating-point values.

In some examples, the example vectorizer 125 performs classical optimizations on the generated vector operations. For example, the vectorizer 125 may perform partial redundancy elimination (PRE) to remove fully-redundant vector loads (e.g., the example vload1 operation and the example vload2 operation in the above example). Thus, for example, the vectorizer 125 may use PRE to optimize the vectorized code in instances when two vector loads access the exact same memory addresses. However, the vectorizer 125 of the illustrated example may perform additional or alternative classical optimizations on the generated vector operations.

A vector load is a type of vector operation that loads data elements from memory using a base address and an offset. In some examples, the offset is multiplied by a fixed value (e.g., a stride load). For example, a vector load with a stride length of one (e.g., a unit-stride load) accesses memory addresses one address apart (e.g., contiguous memory addresses (e.g., a[i], a[i+1], a[i+2], etc.)). A vector load with a stride length of two (e.g., a non-unit stride load) accesses every other memory address starting from a base address (e.g., a[i], a[i+2], a[i+4], etc.). A vector load may also have no fixed stride (e.g., a gather load). For example, a gather load having a vector length of four may access memory addresses a[i+1], a[i+3], a[i+4] and a[i+6]. The data elements loaded by each vector load are stored in respective vector registers (e.g., vectors). When two vector loads access the exact same memory addresses (e.g., vload1 accesses memory addresses a[i], a[i+3] and a[i+4] and vload2 accesses memory addresses a[i], a[i+3] and a[i+4]), the two vector loads are fully-redundant vector loads. When two vector loads overlap on some, but not all, of the memory address accesses (e.g., vload3 accesses memory addresses a[i], a[i+1], a[i+2] and a[i+3] and vload4 accesses memory addresses a[i−1], a[i], a[i+1] and a[i+2]), the two vector loads are partial-redundant vector loads.

As described in further detail below, the example vectorization optimizer 130 performs further optimization on vectorized code (e.g., the intermediate code 140 of FIG. 1) by replacing groups of partial-redundant vector loads with a set of non-redundant vector loads or reduced-redundant vector loads. For example, the vectorization optimizer 130 may perform vector loads to load unique (e.g., non-overlapping) data elements and then perform register operations (e.g., shift operations, concatenation operations, etc.) on the loaded vector elements to generate the vector values with overlapping (e.g., partial-redundant) elements.

For example, the vectorization optimizer 130 may replace three partial-redundant vector loads with two vector loads to load unique (e.g., non-overlapping) data elements into first and second vectors and then perform register operations (e.g., the (V)PALIGN* instruction, the *SHIFT instruction, etc.) on the first and second vectors to compute the third vector. In some examples, the vectorization optimizer 130 uses vector loads to access the range of data elements (e.g., the lowest memory address and the highest memory address) and uses register operations to compute the intermediate vector elements. As memory accesses increase latency in executing code, reducing the total number of memory accesses (e.g., by replacing partial-redundant vector loads with less costly register operations) is useful for reducing completion times.

In the illustrated example of FIG. 1, the code generator 135 processes the output of the vectorization optimizer 130 and generates native and/or machine code 145 that is executed by the machine code processor 105.

Figure 2:
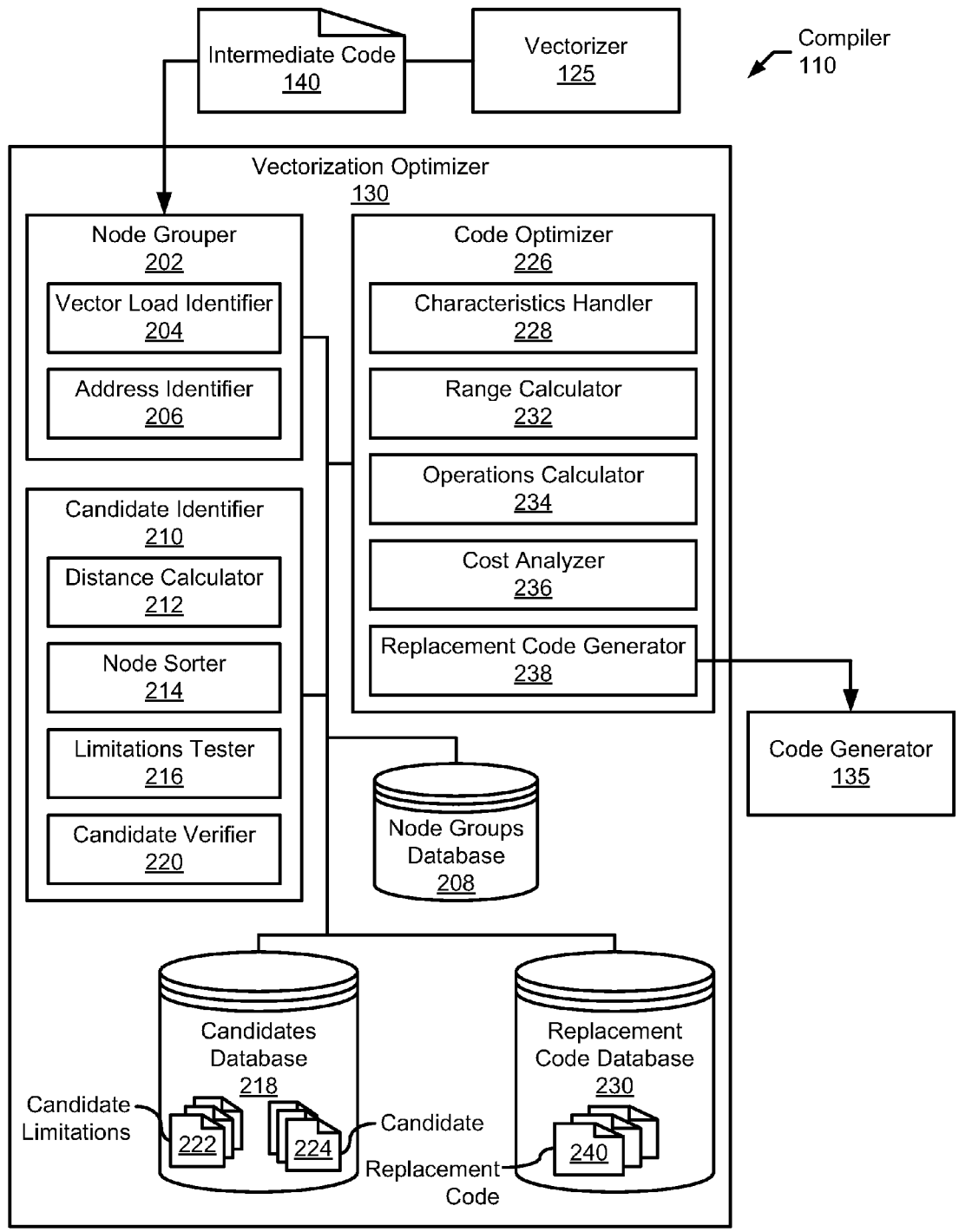
FIG. 2 is a block diagram of an example implementation of the example vectorization optimizer of FIG. 1 that may facilitate eliminating partial-redundant vector loads.

FIG. 2 is a block diagram of the example vectorization optimizer 130 of FIG. 1. In the illustrated example of FIG. 2, the example vectorization optimizer 130 of the illustrated example of FIG. 2 includes an example node grouper 202, an example node groups database 208, an example candidate identifier 210, an example candidates database 218, an example code optimizer 226 and an example replacement code database 230.

The example node grouper 202 groups vector operations obtained from the vectorizer 125 and/or the intermediate code 140. The example node grouper 202 of FIG. 2 groups the vector operations based on characteristics of the respective vector operation. In the illustrated example of FIG. 2, the node grouper 202 includes an example vector load identifier 204 and an example address identifier 206 to group the obtained vector operations based on shared (e.g., in common) vector load type and base address. The example vector load identifier 204 parses the vector operation and identifies the type of the vector load operation. For example, the vector load identifier 204 may determine whether vector operation is a vector load operation (e.g., a stride-load and/or a gather load), a register operation, etc. The example address identifier 206 of FIG. 2 determines the base address of the vector load operations. The base address is a reference to a memory address that serves as a reference point for other memory addresses.

The example node grouper 202 stores the node groups and the associated vector operations (e.g., nodes) in the example node groups database 208. In the illustrated example, the node grouper 202 stores (e.g., logs, records, etc.) the node (e.g., the vector operation) in the example node groups database 208 in association with a node group with the same vector load type and base address. In the illustrated example of FIG. 2, the node grouper 202 stores the node groups that are associated with vector load operations. Thus, all vector operations associated with a group (e.g., a node group) perform the same type of vector load operation on a set of memory addresses offset from the same base address. In some examples, if a node group corresponding to the vector operation does not exist in the node groups database 208, the node grouper 202 adds the node group to the node groups database 208 by, for example, creating a data structure (e.g., a table, a list, a file, etc.) associated with the node group in the node groups database 208.

The example node groups database 208 of the illustrated example of FIG. 2 stores vector operations received via the example node grouper 202 in association with node groups. Such associations enable identification of the vector operations that are the same vector load type and share the same base address. The example node groups database 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example node groups database 208 may additionally or alternatively be implemented by one or more double data rate (DDR) memories, such as DDR, DDR2, DDR3, mobile DDR (mDDR), etc. The example node groups database 208 may additionally or alternatively be implemented by one or more mass storage devices such as hard disk drive(s), compact disk drive(s), digital versatile disk drive(s), etc. While in the illustrated example the node groups database 208 is illustrated as a single database, the node groups database 208 may be implemented by any number and/or type(s) of databases.

The example candidate identifier 210 of the illustrated example of FIG. 2 processes the node groups from the node groups database 208 to identify candidates for optimizing (e.g., one or more vector loads that may be replaced with relatively more efficient code). The example candidate identifier 210 of FIG. 2 includes an example distance calculator 212, an example node sorter 214, an example limitations tester 216 and an example candidate verifier 220.

The example distance calculator 212 of FIG. 2 calculates a distance between two neighboring elements in terms of offset that may be used to deduce the number of non-overlapping elements. In the illustrated example of FIG. 2, the distance calculated by the distance calculator 212 of FIG. 2 represents the number of data elements in the vector operation that do not overlap with the immediate previous neighboring vector operation. For example, if a first vector load operations accesses data elements 1, 2, 3, 4 and a second vector load operations (e.g., the vector load operation immediately previous to the first vector load operation) accesses data elements 0, 1, 2, 3, the data elements in the first vector load operation that do not overlap with the data elements of the second vector load are only the fourth data element. In such examples, the distance calculated by the distance calculator 212 for the first vector load operation is one.

The example node sorter 214 of FIG. 2 orders the vector operations of the node group based on a metric. For example, the node sorter 214 may sort the vector operations from the lowest distance to the highest distance. The example limitations tester 216 applies candidate limitations 222 to the vector operations in the node group to determine whether the node group includes one or more optimization candidates 224. Example replacement limitations include a maximum distance from the base address (e.g., the center), a total number of nodes to process, availability of information about alignment of the base address, availability of the required instructions (e.g., the (V)PALIGN* instruction) for the target architecture, etc. The example limitations tester 216 stores the one or more identified candidates 224 in the example candidates database 218. For example, the example code optimizer 226 may be limited in the number of vector operations it can process at a time (e.g., two vector operations). In some such examples, the limitations tester 216 may apply the replacement limitations 222 to a node group from the node groups database 208 and store one or more candidates 224 in the candidates database 218 in which the one or more candidates 224 is less than or equal to two vector operations.

The example candidate verifier 220 of the illustrated example of FIG. 2 selects a candidate 224 from the example candidates database 218 and performs a dependencies test on the nodes of the candidate 224. For example, the candidate verifier 220 may utilize memory disambiguation techniques to check whether there are intervening writes (e.g., store operations) of the respective memory addresses. In the illustrated example of FIG. 2, when the candidate 224 fails the dependencies test (e.g., an intervening write operation to a respective memory address is detected), the example candidate verifier 220 discards the candidate 224 from further optimizing and provides the original code (e.g., the vector operations in the candidate 224 remain the same (e.g., are unchanged)) to the code generator 135 for processing. When the candidate verifier 220 determines that the candidate 224 passes the dependencies test, the example candidate verifier 220 of the illustrated example of FIG. 2 provides the candidate 224 to the example code optimizer 226 to generate replacement vector operations to execute instead of the vector operations of the candidate 224. In some examples, the candidate verifier 220 updates the candidates 224 in the candidates database 218 to indicate whether the candidates passed or failed the dependencies test.

The example candidates database 218 of the illustrated example of FIG. 2 stores candidates 224 received via the example candidate identifier 210. For example, the limitations tester 216 may store one or more candidates 224 in the candidates database 218. In some examples, the example candidate verifier 220 removes (e.g., discards, deletes, etc.) candidates 224 in the candidates database 218 when, for example, the candidate 224 does not satisfy a dependencies test. The example candidates database 218 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example candidates database 218 may additionally or alternatively be implemented by one or more double data rate (DDR) memories, such as DDR, DDR2, DDR3, mobile DDR (mDDR), etc. The example candidates database 218 may additionally or alternatively be implemented by one or more mass storage devices such as hard disk drive(s), compact disk drive(s), digital versatile disk drive(s), etc. While in the illustrated example the candidates database 218 is illustrated as a single database, the candidates database 218 may be implemented by any number and/or type(s) of databases.

The example code optimizer 226 of the illustrated example of FIG. 2 replaces vector operations of the candidates 224 from the candidates database 218 with replacement vector operations that are relatively more efficient than the candidate vector operations. In some examples, the code optimizer 226 queries a data structure (e.g., a lookup table) for replacement code to replace the vector load operations of a candidate 224. In some examples, the code optimizer 226 generates replacement code for generating the machine code 145 instead of executing the candidate 224. In the illustrated example of FIG. 2, the code optimizer 226 includes an example characteristics handler 228, an example range calculator 232, an example operations calculator 234, an example cost analyzer 236 and an example replacement code generator 238.

The example characteristics handler 228 of FIG. 2 determines characteristics of a candidate 224 from the candidates database 218 to query the example replacement code database 230. For example, the characteristics handler 228 may determine the vector load type of the nodes (e.g., stride loads, gather loads, etc.), determine the vector length of the vectors (1, 2, 4, 8, 16, etc.), determine the data type (e.g., integer values, floating-point values, etc.) of the vector elements, determine the architecture of the machine code processor 105 that is executing the code, etc. The example characteristics handler 228 may then use one or more of the determined characteristics to retrieve replacement code 240 from the replacement code database 230 for substituting with the vector operations of the candidate 224.

In some examples, the replacement code database 230 may not return replacement code for replacing the candidate 224. For example, based on the characteristics of the candidate 224 and the code generation capabilities available to the code generator 135 (e.g., the machine code processor architecture, the operations available to the code generator 135, etc.), relatively more efficient code may not be available for replacing the candidate 224. In some such examples, the replacement code database 230 may return an indication that replacement code is not available for substitution with the candidate 224 (e.g., a "N/A" indicator). As a result, the example characteristics handler 228 of FIG. 2 may determine further optimization of the candidate 224 is not available and pass the instructions of the candidate 224 to the code generator 135.

In some examples, replacement code for particular characteristics may not have been previously determined, populated and/or generated. For example, the replacement code database 230 may return an empty set indication (e.g., a null value) indicating that replacement code is not available for substitution with the candidate 224. In some such examples, the code optimizer 226 may generate replacement code. The example code optimizer 226 of FIG. 2 includes the example range calculator 232 to determine the range of data elements accessed by the candidate 224. For example, the range calculator 232 may parse the nodes of the candidate 224 and identify the highest unique (e.g., non-overlapping) memory address and the lowest unique memory address to calculate the range of unique data elements accessed by the candidate 224.

The example code optimizer 226 of FIG. 2 includes the example operations calculator 234 to determine the number of vector operations that are needed to replace the nodes of the candidate 224. For example, the operations calculator 234 may determine the number of vector load operations that are needed to load the unique data elements. For example, the operations calculator 234 may use the range of data elements identified by the range calculator 232 to determine the number of vector load operations to execute with minimal redundancy. The example operations calculator 234 also determines the number of register operations that are needed to produce the intermediate (e.g., overlapping) data elements. For example, the operations calculator 234 may determine the number of shift operations, add operations, (V)PALIGN* operations, etc. that may be executed to produce the partially-redundant vector loads.

Equation 1 below is an example equation that may be used to determine the number of vector load operations that may be eliminated. For example, partially-redundant vector load operations may be replaced with register operations.

$$\text{Number of vector loads eliminated} = a - \text{ceiling}(b/c) \quad \text{Equation 1:}$$

In Equation 1 above, the number of vector loads (a) is the total number of vector load operations in the candidate. For example, referring to FIG. 3A, the example pseudo-code representing example candidate 300 includes a total number of five vector load operations. The number of data elements (b) is the total number of data elements that are accessed at least once by the vector load operations of the candidate. The vector size (c) is the length of the vector operations in terms of elements. For example, in the example of FIGS. 3A and 3B, the vector size (c) is four elements.

Equation 2 below is an example equation that may be used to calculate the total number of data elements (b) accessed at least once by the vector load operations of the candidate.

$$\text{Total number of data elements}(b) = c + \Sigma_{k=2}^{a} \text{distance}_k \quad \text{Equation 2:}$$

In Equation 2 above, the distance represents the number of data elements in a vector load operation that do not overlap with the immediate previous neighboring vector load operation. In the illustrated example of FIGS. 3A and 3B, the $\text{distance}_k$ for each vector load operation is equal to one. For example, in the second vector load operation, the fourth data element (e.g., the data element accessed at memory location a[i+2]) does not overlap with the data elements in the first vector load operation. As a result, in the illustrated example, the $\text{distance}_2$ is one. In a similar manner, the values of $\text{distance}_3$, $\text{distance}_4$ and $\text{distance}_5$ can also be determined to be one. Plugging the respective $\text{distance}_k$ values and the vector size (c) of the vector load operations in the candidate 300 in Equation 2 above, the total number of data elements (b) is eight data elements. As a result, in the illustrated example, by plugging the respective values (a), (b) and (c) in Equation 1 above, the total number of vector load operations that may be eliminated using the techniques disclosed herein is three (e.g., 5−ceiling(8/4)=3). As shown below in connection with FIG. 4, which represents example pseudo-code 400 after the partially-redundant vector load operations have been removed from the candidate 300 of FIG. 3A using the techniques disclosed herein, the number of vector load operations is reduced from five vector load operations in the candidate 300 to two vector load operations in the pseudo-code 400 (e.g., three vector load operations were eliminated from the candidate 300).

The example code optimizer 226 of FIG. 2 includes the cost analyzer 236 to determine whether executing replacement code is relatively more efficient than executing the vector operations of the candidate 224. For example, the cost analyzer 236 may calculate the cost of the candidate 224 (e.g., the amount of time that passes when executing the candidate 224). The example cost analyzer 236 may also estimate the cost of executing replacement code based on the amount of time that passes when executing the number of vector load operations and register operations calculated by the example operations calculator 234. The cost of executing the replacement code may depend on, for example, the machine code processor architecture, the number of vector operations in the candidate 224, the number of vector loads needed to load the unique data elements, the number of register operations needed to load the overlapping data elements, the base address alignment, the port pressure in the current program spot, the register pressure in the current program spot, etc. In the illustrated example of FIG. 2, the cost analyzer 236 provides the original code (e.g., the candidate 224) to the code generator 135 for generating the machine code 145 when the cost of executing the candidate 224 is less than or equal to the estimated cost of executing replacement code. In some examples, the cost analyzer 236 may compare the estimated cost of executing the replacement code to a threshold cost such as a percentage of the cost of executing the candidate 224 (e.g., 80% of the cost of executing the candidate 224, 120% of the cost of executing the candidate 224, etc.).

In the illustrated example of FIG. 2, the code optimizer 226 includes the example replacement code generator 238 to generate replacement code to replace the vector operations of the candidate 224 when the cost analyzer 236 determines that the estimated cost of executing replacement code is less than the cost of executing the candidate 224. The example replacement code generator 238 generates replacement code based on the number of vector load operations and register operations identified by the operations calculator 234. In some examples, the replacement code generator 238 updates the replacement code database 230 to include the generated code 240 for substituting with the candidate 224.

The example replacement code database 230 of the illustrated example of FIG. 2 stores replacement code (e.g., vector operations) that may be used to replace instructions of a candidate 224. The replacement code 240 stored by the replacement code database 230 enables the example code optimizer 226 to look-up previously populated replacement code that may be substituted for original code (e.g., the instructions of the candidate 224). For example, the replacement code database 230 may include replacement code that is relatively more efficient than executing the candidate 224 based on specified characteristics of the candidate 224. In some examples, the replacement code database 230 may be pre-populated with the replacement code 240 that maps to candidates 224. In some examples, the code optimizer 226 may update the replacement code database 230 to include new replacement code. For example, the code optimizer 226 may generate replacement code 240 based on the known characteristics of the candidate 224. An example data table 900 representing example replacement code that maps to the replacement candidate based on the characteristics of the replacement candidate is represented in the illustrated example of FIG. 9.

The example replacement code database 230 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example replacement code database 230 may additionally or alternatively be implemented by one or more double data rate (DDR) memories, such as DDR, DDR2, DDR3, mobile DDR (mDDR), etc. The example replacement code database 230 may additionally or alternatively be implemented by one or more mass storage devices such as hard disk drive(s), compact disk drive(s), digital versatile disk drive(s), etc. While in the illustrated example the replacement code database 230 is illustrated as a single database, the replacement code database 230 may be implemented by any number and/or type(s) of databases.

Figures 3A, 3B:
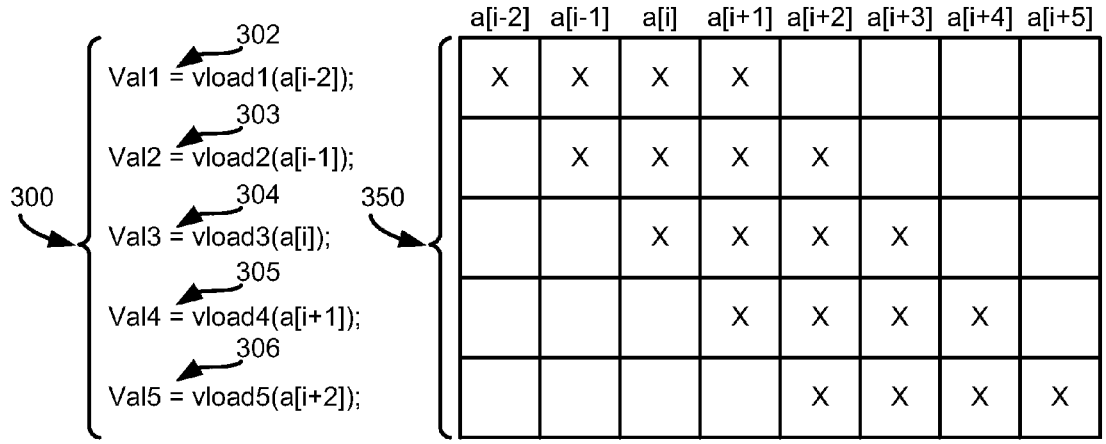
FIG. 3A illustrates pseudo-code representing a candidate that may be output by the example vectorizer of FIG. 1.
FIG. 3B illustrates a table representing memory address accesses corresponding to the candidate of FIG. 3A.

FIG. 3A illustrates pseudo-code that may be output by the example vectorizer 125 of FIG. 1. In the illustrated example of FIG. 3A, the pseudo-code includes a candidate 300 that calculates five values by performing five vector load operations (e.g., an example vload1 302, an example vload2 303, an example vload3 304, an example vload4 305 and an example vload5 316). Each vector load 302-306 operates on four continuous memory addresses. For example, the candidate 300 calculates a first value by performing the vload1 operation 302 that accesses memory addresses a[i−2], a[i−1], a[i] and a[i+1] of FIG. 3B, calculates a second value by performing the vload2 operation 303 that accesses memory addresses a[i−1], a[i], a[i+1] and a[i+2] of FIG. 3B, calculates a third value by performing the vload3 operation 304 that accesses memory addresses a[i], a[i+1], a[i+2] and a[i+3] of FIG. 3B, calculates a fourth value by performing the vload4 operation 305 that accesses memory addresses a[i+1], a[i+2], a[i+3] and a[i+4] of FIG. 3B, and calculates a fifth value by performing the vload5 operation 306 that accesses memory addresses a[i+2], a[i+3], a[i+4] and a[i+5] of FIG. 3B.

In the illustrated example of FIG. 3A, the vload1 operation 302 and the vload5 operation 306 access unique (e.g., non-overlapping) memory addresses. For example, the vload1 operation 302 accesses the memory address a[i−2] and the vload5 operation 306 accesses the memory address a[i+5]. As a result, when performing vectorization optimization, the example code optimizer 226 determines that performing the vload1 operation 302 and the vload5 operation 306 is needed to access all of the data elements of the candidate 300.

Figure 4:
FIG. 4 illustrates pseudo-code representing the candidate of FIG. 3 after the partially-redundant vector loads have been removed by the example vectorization optimizer of FIGS. 1 and/or 2.

In addition the example code optimizer 226 may determine that the remaining values (e.g., the second value, the third value and the fourth value) may be calculated by performing one or more register operations on the data elements accessed by the vload1 operation 302 and the vload5 operation 306. FIG. 4 illustrates pseudo-code 400 representing the candidate 300 of FIG. 3A after the partially-redundant vector loads have been removed using the techniques disclosed herein. For example, the replacement code generator 238 may generate the example pseudo-code 400. The example pseudo-code 400 includes the vload1 operation 302 and the vload5 operation 306 of FIG. 3A to calculate the first value and the fifth value. The example pseudo-code 400 also includes three register operations (e.g., RegOps1 402, RegOps2 403 and RegOps3 404) to calculate the second value, the third value and the fourth value.

Figure 5:
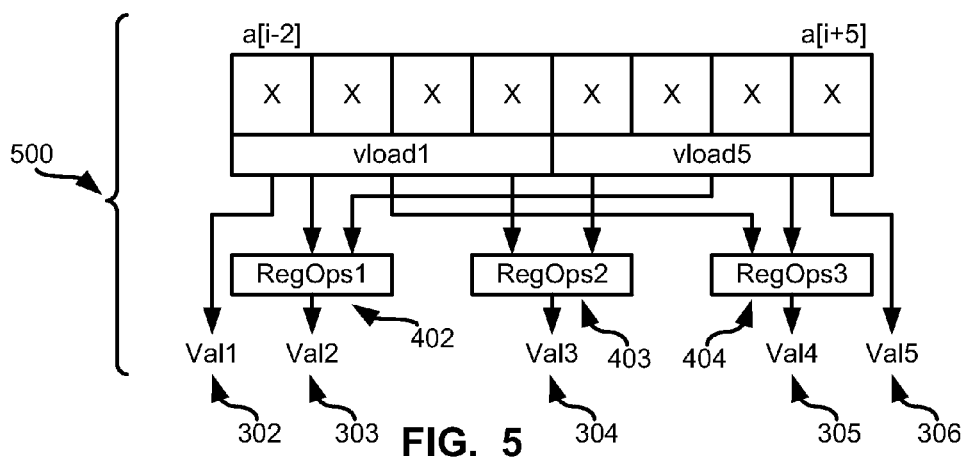
FIG. 5 is a graphical representation of the example pseudo-code of FIG. 4.

FIG. 5 is a graphical representation 500 of the pseudo-code 400. The graphical representation 500 indicates that the first value is calculated by performing the vload1 operation 302 and the fifth value is calculated by performing the vload5 operation 306. The graphical representation 500 also indicates that the second value is calculated by performing a first set of register operations (e.g., the example RegOps1 402) on the data elements loaded by the vload1 operation 302 (e.g., the second, third and fourth data elements of Val1) and the vload5 operation 306 (e.g., the first data element of Val5), that the third value is calculated by performing a second set of register operations (e.g., the example RegOps2 403) on the data elements loaded by the vload1 operation 302 (e.g., the third and fourth data elements of Val1) and the vload5 operation 306 (e.g., the first and second data elements of Val5) and the fourth value is calculated by performing a third set of register operations (e.g., the example RegOps3 404) on the data elements loaded by the vload1 operation 302 (e.g., the fourth data element of Val1) and the vload5 operation 306 (e.g., the first, second and third data elements of Val5).

Figure 6:
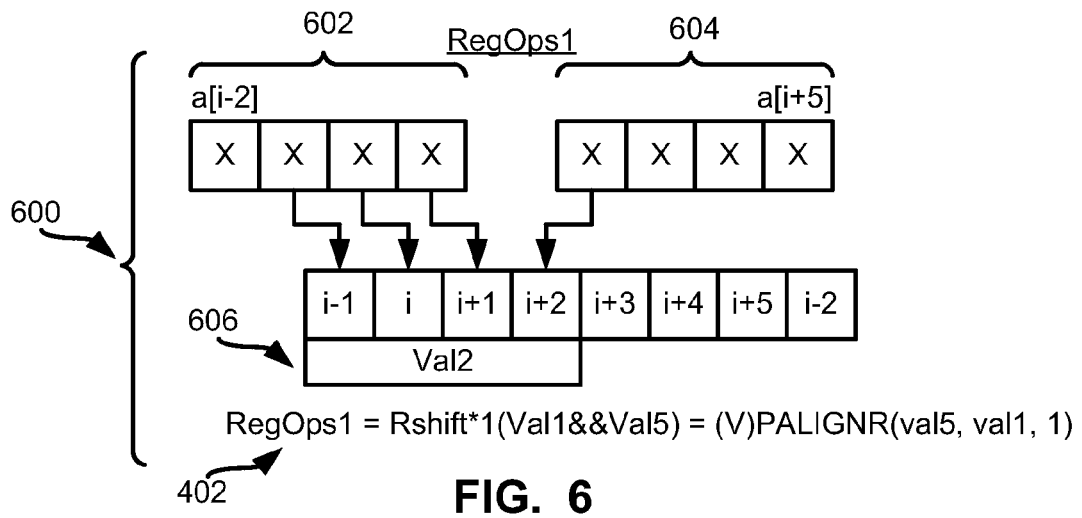
FIG. 6 is a graphical representation of how to calculate the example second value of FIGS. 3-5.

FIG. 6 is a graphical representation 600 of how to calculate the second value based on the first set of register operations (e.g., the example RegOps1 402). In the illustrated example of FIG. 6, an example first data vector 602 is the data elements that are loaded by the vload1 operation 302, and an example second data vector 604 is the data elements that are loaded by the vload5 operation 306. In the illustrated example, the data elements loaded by the vload2 operation 303 (e.g., an example third data vector 606) can be recreated by combining the first and second data vectors 602, 604. For example, the data elements that form the third data vector 606 are the same as the second, third and fourth data elements of the first data vector 602 and the first data element of the second data vector 604. In the illustrated example, the third data vector 606 may be calculated by concatenating the data elements loaded by the vload1 operation 302 (e.g., the first data vector 602) and the vload5 operation 306 (e.g., the second data vector 604), and performing one right shift on the concatenation. As described above, in some architectures, the vector operations of concatenating and right shifting may be performed by executing the (V)PALIGN* function. For example, the first set of register operations may be executed by passing the second data vector 604, the first data vector 602 and a one-shift indicator to the (V)PALIGNR function.

Figure 7:
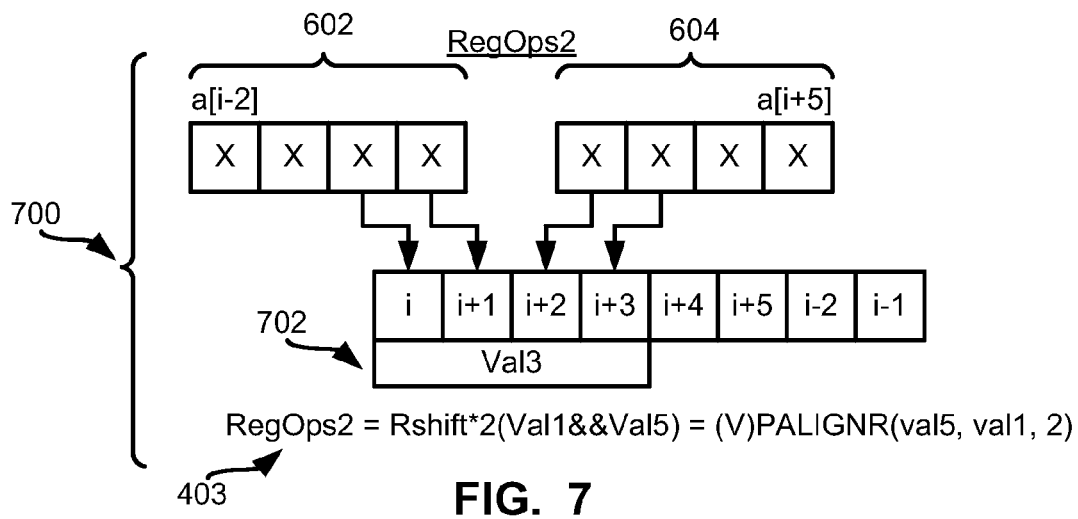
FIG. 7 is a graphical representation of how to calculate the example third value of FIGS. 3-5.

FIG. 7 is a graphical representation 700 of how to calculate the third value based on the second set of register operations (e.g., the example RegOps2 403). In the illustrated example, the data elements loaded by the vload3 operation 304 (e.g., an example fourth data vector 702) can be recreated by combining the first and second data vectors 602, 604. For example, the data elements that form the fourth data vector 702 are the same as the third and fourth data elements of the first data vector 602 and the first and second data elements of the second data vector 604. In the illustrated example, the fourth data vector 702 may be calculated by concatenating the data elements loaded by the vload1 operation 302 (e.g., the first data vector 602) and the vload5 operation 306 (e.g., the second data vector 604), and performing two right shifts on the concatenation. For example, the second set of register operations may be executed by passing the second data vector 604, the first data vector 602 and a two-shift indicator to the (V)PALIGNR function.

Figure 8:
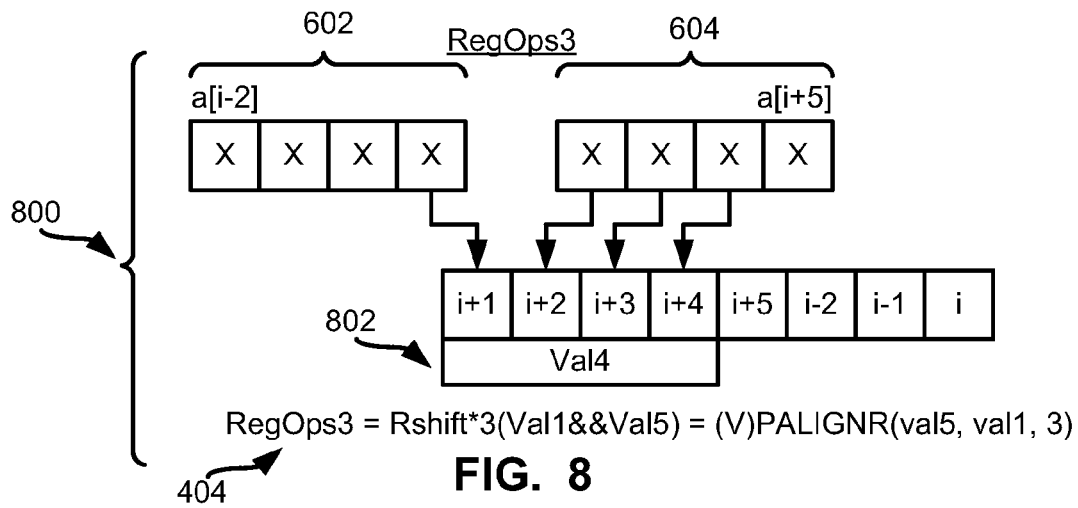
FIG. 8 is a graphical representation of how to calculate the example fourth value of FIGS. 3-5.

FIG. 8 is a graphical representation 800 of how to calculate the fourth value based on the third set of register operations (e.g., the example RegOps3 404). In the illustrated example, the data elements loaded by the vload4 operation 305 (e.g., an example fifth data vector 802) can be recreated by combining the first and second data vectors 602, 604. For example, the data elements that form the fifth data vector 802 are the same as the fourth data element of the first data vector 602 and the first, second and third data elements of the second data vector 604. In the illustrated example, the fifth data vector 802 may be calculated by concatenating the data elements loaded by the vload1 operation 302 (e.g., the first data vector 602) and the vload5 operation 306 (e.g., the second data vector 604), and performing three right shifts on the concatenation. For example, the third set of register operations may be executed by passing the second data vector 604, the first data vector 602 and a three-shift indicator to the (V)PALIGNR function.

FIG. 9 represents an example data table 900 that may be stored by the vectorization optimizer 130 representing replacement code associated with different characteristics of a replacement candidate. The example data table 900 of the illustrated example of FIG. 9 is stored in the example replacement code database 230 of FIG. 2. The example data table 900 of the illustrated example of FIG. 9 includes a candidate identifier column 905, a vector load type column 910, a data type column 915, a vector size column 920, a CPU architecture column 925 and a replacement code column 930.

The example candidate identifier column 905 indicates an identifier of a replacement candidate (e.g., the original instructions of the intermediate code 140) that may be replaced with replacement code (e.g., the replacement code 240). In the illustrated example, the candidate identifier is a unique serial identifier. However, any other approach uniquely identifying a replacement candidate may additionally or alternatively be used.

The example vector load type column 910, the example data type column 915, the example vector size column 920 and the example CPU architecture column 925 of the data table 900 are characteristic columns that may be used to map a replacement candidate to replacement code in the data table 900. The example vector load type column 910 identifies the type of the vector load operation (e.g., stride loads, gather loads, etc.) associated with the corresponding candidate identifier. The example data type column 915 identifies the data type (e.g., integer values, floating-point vales, etc.) associated with the corresponding candidate identifier. The example vector size column 920 identifies the number of elements in the vectors associated with the corresponding candidate identifier. The example CPU architecture column 925 identifies the type of machine code processor that is compiling the program (e.g., the example source code 120 of FIG. 1). For example, the CPU architecture column 925 may indicate the machine code processor 105 is an x86 architecture processor.

The example replacement code column 930 identifies the replacement code that may be executed instead of the original vector load instructions of the corresponding replacement candidate. In some examples, the replacement code column 930 may indicate that replacement code is not available (e.g., "N/A"). For example, replacement code may not be available for the replacement candidate if, for example, cost efficient replacement code is not available, and/or the specific combination of replacement candidate characteristics have not been tested yet.

The example data table 900 of the illustrated example of FIG. 9 includes three example rows 950, 960, 970. The example first row 950 indicates that candidate ID "0011" is representative of a replacement candidate that includes nodes that perform unit-stride loads, that the corresponding vectors hold two integer values and that the corresponding vector loads are being executed on a machine code processor with an "ARCH-1" architecture. In addition, replacement code is available for execution instead of the original vector loads of the replacement candidate characterized in the example first row 950.

The example second row 960 indicates that candidate ID "0012" is representative of a replacement candidate that includes nodes that perform unit-stride loads, that the corresponding vectors hold four floating-point values and that the corresponding vector loads are being executed on a machine code processor with an "ARCH-2" architecture. In addition, replacement code is not available for the replacement candidate characterized in the example second row 960.

The example third row 970 indicates that candidate ID "0021" is representative of a replacement candidate that includes nodes that perform gather loads, that the corresponding vectors hold three integer values and that the corresponding vector loads are being executed on a machine code processor with an "ARCH-1" architecture. In addition, replacement code is not available for the replacement candidate characterized in the example third row 970.

While an example manner of implementing the example platform 100 of FIG. 1 is illustrated in FIG. 1, and example manner of implementing the example vectorization optimizer 130 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example vectorizer 125, the example vectorization optimizer 130, the example code generator 135 and/or, more generally, the example platform 100 of FIG. 1, and/or the example node grouper 202, the example vector load identifier 204, the example address identifier 206, the example node groups database 208, the example candidate identifier 210, the example distance calculator 212, the example node sorter 214, the example limitations tester 216, the example candidates database 218, the example candidate verifier 220, the example code optimizer 226, the example characteristics handler 228, the example replacement code database 230, the example range calculator 232, the example operations calculator 234, the example cost analyzer 236, the example replacement code generator 238 and/or, more generally, the example vectorization optimizer 130 of FIG. 1 may be implemented by hardware, software, firmware and/or any combination of hardware, software and/or firmware. Thus, for example, any of the example vectorizer 125, the example vectorization optimizer 130, the example code generator 135 and/or, more generally, the example platform 100 of FIG. 1, and/or the example node grouper 202, the example vector load identifier 204, the example address identifier 206, the example node groups database 208, the example candidate identifier 210, the example distance calculator 212, the example node sorter 214, the example limitations tester 216, the example candidates database 218, the example candidate verifier 220, the example code optimizer 226, the example characteristics handler 228, the example replacement code database 230, the example range calculator 232, the example operations calculator 234, the example cost analyzer 236, the example replacement code generator 238 and/or, more generally, the example vectorization optimizer 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example vectorizer 125, the example vectorization optimizer 130, the example code generator 135 and/or, more generally, the example platform 100 of FIG. 1, and/or the example node grouper 202, the example vector load identifier 204, the example address identifier 206, the example node groups database 208, the example candidate identifier 210, the example distance calculator 212, the example node sorter 214, the example limitations tester 216, the example candidates database 218, the example candidate verifier 220, the example code optimizer 226, the example characteristics handler 228, the example replacement code database 230, the example range calculator 232, the example operations calculator 234, the example cost analyzer 236, the example replacement code generator 238 and/or, more generally, the example vectorization optimizer 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example platform 100 of FIG. 1 may include one or more elements, processes and/or devices in addition to, or instead of, those illustrated in FIG. 1, and/or the example vectorization optimizer 130 of FIG. 1 may include one or more elements, processes and/or devices in addition to, or instead of, those illustrated in FIG. 2, and/or may include more than one of any or all of the illustrated elements, processes and devices.

Figure 10:
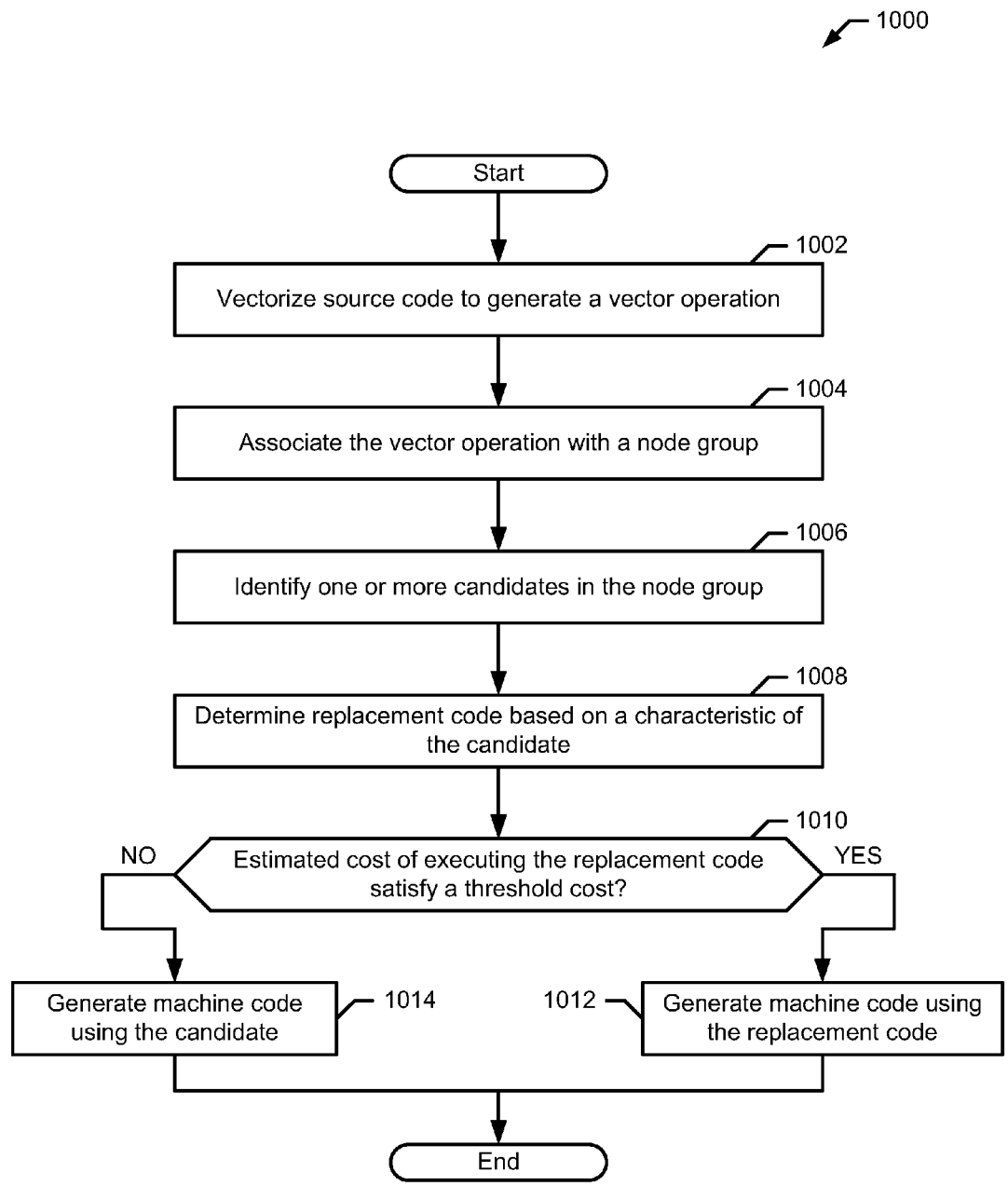
FIG. 10 is a flow chart representative of example machine-readable instructions that may be executed by the example compiler of FIG. 1 to generate machine code from source code.

Flowcharts representative of example machine-readable instructions for implementing the example platform 100 of FIG. 1 is shown in FIG. 10. Flowcharts representative of example machine-readable instructions for implementing the example vectorization optimizer 130 of FIGS. 1 and/or 2 are shown in FIGS. 11-15. In these example(s), the machine-readable instructions comprise a program(s) for execution by a processor such as the processor 1612 shown in the example processor platform server 1600 discussed below in connection with FIG. 16. The program(s) may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program(s) is/are described with reference to the flowcharts illustrated in FIGS. 10-14 and/or 15, many other methods of implementing the example platform 100 and/or the example vectorization optimizer 130 may alternatively be used. For example, the order of execution of the blocks may be changed, and/or some of the blocks described may be changed, eliminated, or combined.

As mentioned above, the example processes of FIGS. 10-14 and/or 15 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine-readable storage medium" are used interchangeably. Additionally or alternatively, the example processes of FIGS. 10-14 and/or 15 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 10 is a flowchart representative of example machine-readable instructions 1000 that may be executed by the example platform 100 of FIG. 1 to replace groups of partial-redundant vector loads with a smaller set of non-redundant vector operations or reduced-redundant vector operations. The example instructions 1000 of the illustrated example of FIG. 10 begin at block 1002 when the example vectorizer 125 (FIG. 1) vectorizes the source code 120 to generate vector operations. For example, the vectorizer 125 converts the source 120 from a scalar implementation to a vector implementation. At block 1004, the example vectorization optimizer 130 (FIG. 1) associates a vector operation with a node group. For example, the node grouper 202 of FIG. 2 may associate the vector operation with a node group based on the type of the vector load operation (e.g., a unit-stride load, a non-unit stride load, a gather load, etc.) and the base address of the vector operation.

At block 1006, the example vectorization optimizer 130 processes a node group and identifies one or more candidates for replacement in the node group. For example, the candidate identifier 210 of FIG. 2 may identify a subset of vector operations of the node group that satisfy the candidate limitations 222 and that satisfy a dependencies test. At block 1008, the example vectorization optimizer 130 determines replacement code based on a characteristic of the candidate. For example, the code optimizer 226 of FIG. 2 may query a look-up table for replacement code based on the type of the vector load operation, the vector size, the data element type, a result mask, stride, architecture, etc. In some examples, the code optimizer 226 generates the replacement code based on the characteristics of the candidate.

At block 1010, the vectorization optimizer 130 determines whether an estimated cost of executing the replacement code satisfies a threshold cost. For example, the code optimizer 226 may perform a cost analysis of executing the replacement code and of executing the candidate and identify which is relatively more efficient. In some examples, the threshold cost corresponds to the cost of executing the candidate. In some examples, the code optimizer 226 determines whether the estimated cost is less than the cost of executing the candidate. In some examples, the threshold cost corresponds to a percentage (e.g., 80% the cost of executing the candidate, 120% the cost of executing the candidate, etc.). If, at block 1010, the code optimizer 226 determined that executing the replacement code is relatively more efficient than executing the candidate (e.g., satisfies the threshold cost), then, at block 1012, the example code generator 135 (FIG. 1) generates the machine code 145 using the vector operations of the replacement code. If, at block 1010, the code optimizer 226 determined that executing the replacement code is not relatively more efficient than executing the candidate (e.g., does not satisfy the threshold cost), then, at block 1014, the example code generator 135 generates the machine code 145 using the vector operations of the candidate. The example program 1000 of FIG. 10 then ends.

Figure 11:
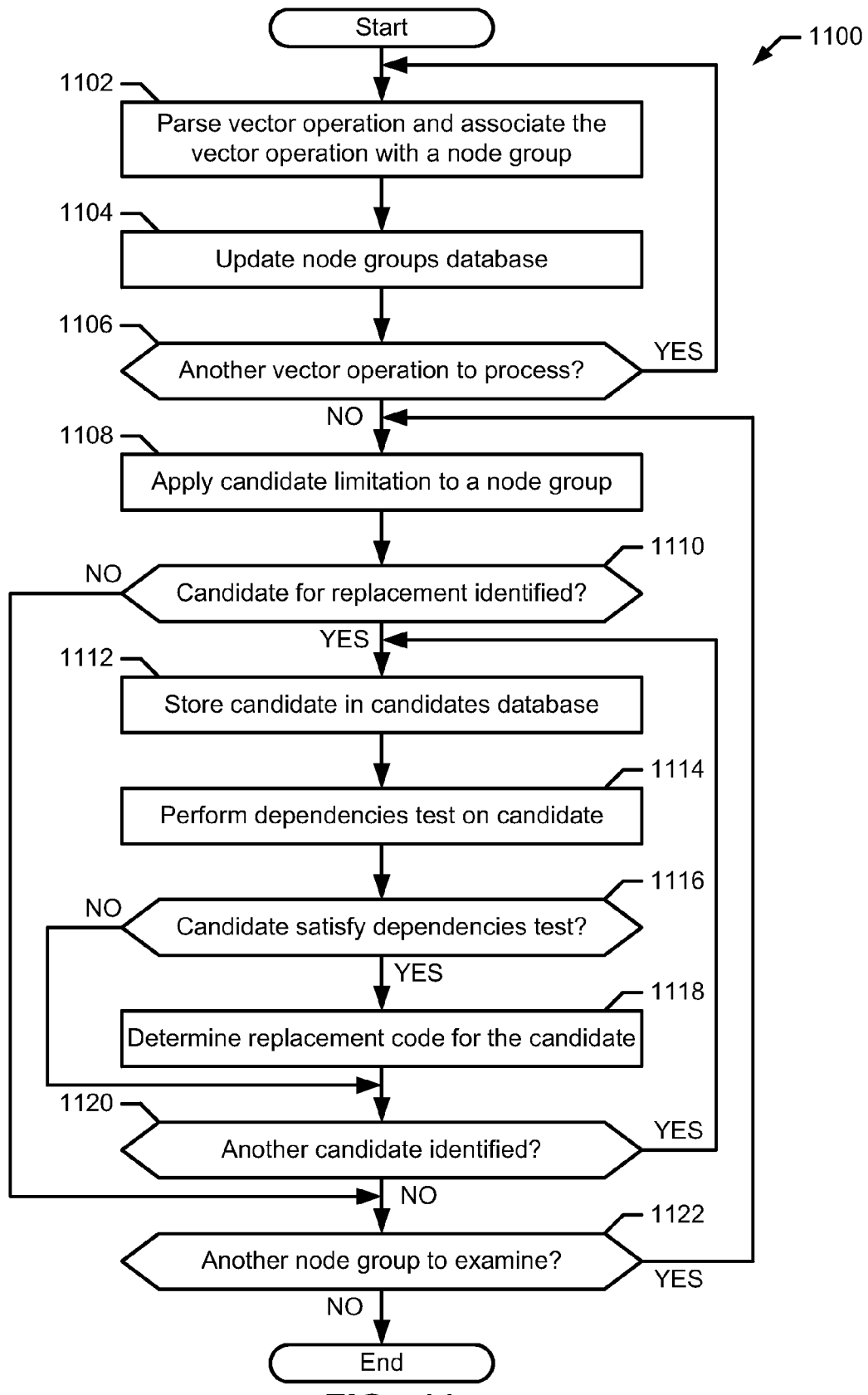
FIG. 11 is a flow chart representative of example machine-readable instructions that may be executed to replace groups of partial-redundant vector loads with smaller sets of non-redundant or reduced-redundant vector loads.

FIG. 11 is a flowchart representative of example machine-readable instructions 1100 that may be executed by the example vectorization optimizer 130 of FIGS. 1 and/or 2 to replace groups of partial-redundant vector loads with a smaller set of non-redundant vector operations or reduced-redundant vector operations. The example instructions 1100 of the illustrated example of FIG. 11 begin at block 1102 when the example node grouper 202 (FIG. 2) parses a vector operation and associates the vector operation with a node group. In the illustrated example, the example node grouper 202 obtains the vector operation from the example vectorizer 125 (FIG. 1) and determines the vector load type of the vector operation. An example approach of parsing vector operations and associating the vector operation with a corresponding node group is described below in connection with FIG. 12. At block 1104, the example node grouper 202 updates the example node groups database 208 (FIG. 2) by, for example, recording the vector operation and/or the corresponding node group in the node groups database 208.

At block 1106, the example node grouper 202 determines whether there is another vector operation to process. For example, the node grouper 202 may query the vectorizer 125 to check if the vectorizer 125 is still vectorizing the source code 120. If, at block 1106, the node grouper 202 determines that there is another vector operation to process, control returns to block 1102 to parse the vector operation and to associate the vector operation with a corresponding node group.

If, at block 1106, the node grouper 202 determined that there were not additional vector operations to process, then, at block 1108, the example candidate identifier 210 (FIG. 2) applies candidate limitations 222 to a node group and its associated vector operations. For example, the candidate identifier 210 may retrieve a node group and its associated vector operations from the node groups database 208 and identify a subset of the vector operations of the node group as a candidate for optimization based on characteristics of the vector operations (e.g., vector load type, distance from the base address, etc.). An example approach to apply candidate limitations 222 to a node group is described below in connection with FIG. 13. In some examples, the candidate limitations may be used to filter vector operations based on the number of vector operations that can be processed by the example code optimizer 226 (FIG. 2). The example candidate identifier 210 stores the identified candidate 224 in the example candidates database 218 (FIG. 2).

At block 1110, the example candidate identifier 210 determines whether the examined node group includes any candidates for optimizing (e.g., the example candidates 224). If, at block 1110, the example candidate identifier 210 determined that the examined node group did not include any candidates for optimizing, then control proceeds to block 1122 to determine whether there is another node group to examine. For example, the candidate identifier 210 may query the node groups database 208 for unexamined node groups.

If, at block 1110, the example candidate identifier 210 identified a candidate 224 from the examined node group, then, at block 1112, the candidate identifier 210 stores the candidate 224 in the candidates database 218. At block 1114, the example candidate identifier 210 performs a dependencies test on the candidates. For example, the candidate identifier 210 may retrieve a candidate 224 from the candidates database 218 and check whether executing the vector operations in the candidate 224 would change the result of the operations (e.g., whether the change in the order of operations affects the semantics of the program 120).

At block 1116, the example candidate identifier 210 determines whether the candidate 224 satisfies the dependencies test. If, at block 1116, the candidate identifier 210 determined that the candidate 224 did not satisfy the dependencies tests (e.g., the order of operations would change the results of the operations), then control proceeds to block 1120 to determine whether the node group includes another candidate for testing.

If, at block 1116, the candidate identifier 210 determined that the candidate 224 did satisfy the dependencies test, then, at block 1118, the example code optimizer 226 generates replacement code to replace the operations of the candidate 224. In some examples, the code optimizer 226 queries the example replacement code database 230 for replacement code. For example, the code optimizer 226 may provide the characteristics of the candidate 224 (e.g., vector load type, data type, vector size, machine code processor architecture, etc.) to the replacement code database 230 and wait for the result of the query. In some examples, the code optimizer 226 may use a look-up table that maps characteristics of the candidate 224 to replacement code (e.g., the replacement code 240). An example data table 900 including replacement candidate characterizations that may be mapped to generate replacement code is shown in the illustrated example of FIG. 9. Example approaches to generate replacement code for the candidate are described below in connection with FIG. 14 and/or 15. In some examples, the code optimizer 226 may generate the replacement code 240.

If, at block 1116, the candidate identifier 210 determined that the candidate 224 did not satisfy the dependencies test, or after the code optimizer 226 generated the replacement code at block 1118, then, at block 1120, the example candidate identifier 210 determines whether the node group includes another candidate for testing. For example, the candidate identifier 210 may query the example candidates database 218 for unprocessed candidates 224. If, at block 1120, the example candidate identifier 210 identified another candidate 224 to test, then control returns to block 1112 and the example candidate identifier 210 performs a dependencies test on the identified candidate 224.

If, at block 1110 or block 1120, the candidate identifier 210 did not identify a candidate 224, then, at block 1122, the example candidate identifier 210 determines whether there is an unprocessed node group to process. For example, the candidate identifier 210 may query the node groups database 208 to determine if the node groups database 208 includes an unexamined node group. If, at block 1122, the example candidate identifier 210 determined that the node groups database 208 included an unexamined node group, control returns to block 1108 and the candidate identifier 210 applies replacement limitations to the unexamined node group.

If, at block 1122, the example candidate identifier 210 determined that the node groups database 208 did not include any unexamined node groups, then the example program 1100 of FIG. 11 ends.

Figure 12:
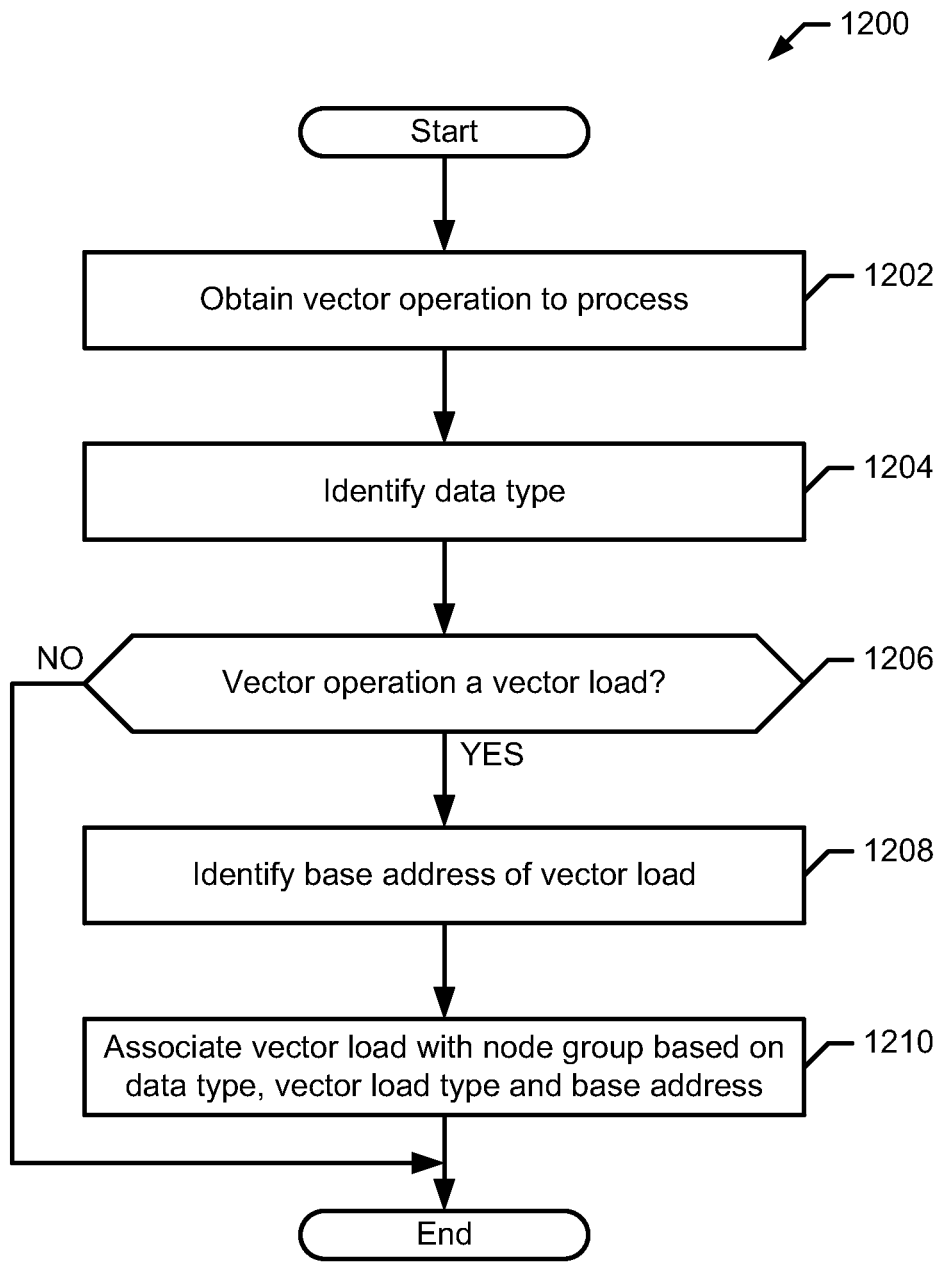
FIG. 12 is a flow chart representative of example machine-readable instructions that may be executed to parse vector operations and associate the vector operations with node groups.

FIG. 12 is a flowchart representative of example machine-readable instructions 1200 that may be executed by the example node grouper 202 of FIG. 2 to parse vector operations and associate a vector load operation with a corresponding node group. The example process 1200 of the illustrated example of FIG. 12 begins at block 1202 when the example node grouper 202 obtains a vector operation to process. For example, the node grouper 202 may query the example vectorizer 125 for a vector operation and/or the node grouper 202 may retrieve a vector operation from the example intermediate code 140 output by the vectorizer 125.

At block 1204, the example node grouper 202 determines the data element type of the obtained vector operation. For example, the vector load identifier 204 may determine that the data elements of the vector operation are integer values, floating-point values, etc. At block 1206, the example vector load identifier 204 determines whether the vector operation is a vector load operation. For example, the vector load identifier 204 may determine the vector operation is a vector load operation (e.g., a stride load, a non-stride load and/or a gather load), a vector addition operation, a vector shift operation, a vector multiplication operation, etc. If, at block 1206, the example vector load identifier 204 determined that the vector operation was a vector load operation, then, at block 1208, the example address identifier 206 identifies the base address of the vector load operation. In the illustrated example, the base address is an address that serves as a reference point for accessing other memory addresses in the vector load operation.

At block 1210, the example node grouper 202 associates the vector load operation with a node group based on its determined data element type, vector load type and base address. If, at block 1206, the example vector load identifier 204 determined that the vector operation was not a vector load operation (e.g., a vector operation that is a vector addition operation, a vector shift operation, a vector multiplication operation, etc.), or after the node grouper 202 associates the vector load with a node group in the node groups database 208 at block 1210, the example program 1200 of FIG. 12 ends.

Figure 13:
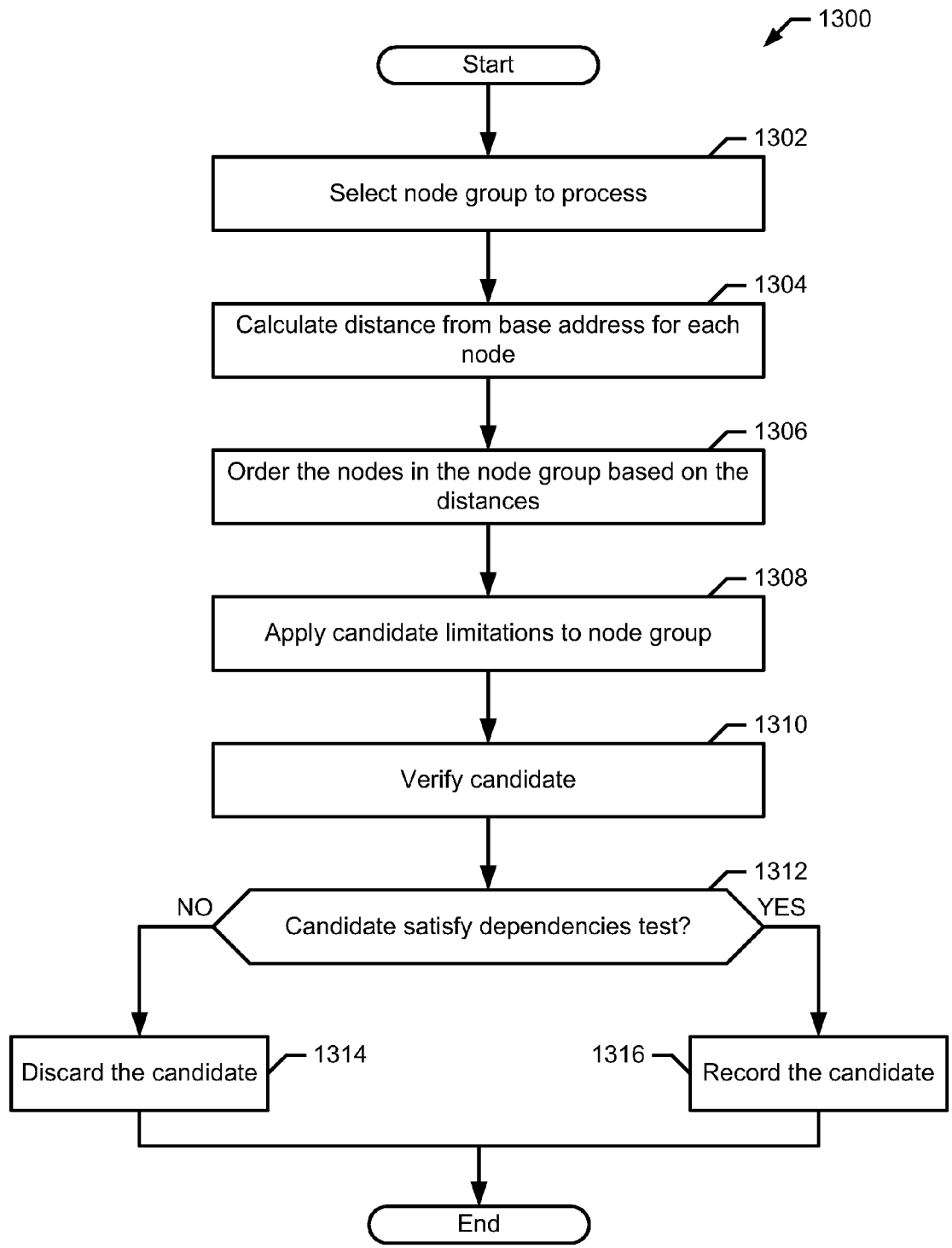
FIG. 13 is a flow chart representative of example machine-readable instructions that may be executed to apply one or more replacement limitations to a group.

FIG. 13 is a flowchart representative of example machine-readable instructions 1300 that may be executed by the example candidate identifier 210 of FIG. 2 to identify optimization candidates in a node group. The example process 1300 of the illustrated example of FIG. 13 begins at block 1302 when the example candidate identifier 210 selects a node group to process. For example, the candidate identifier 210 may query the example node groups database 208 for an unprocessed group and its associated nodes. At block 1304, the example candidate identifier 202 computes a distance from the base address for each node in the node group. For example, the example distance calculator 212 may calculate a distance from the center of each base address of the nodes (e.g., the vector loads) of the node group.

At block 1306, the example candidate identifier 210 orders the nodes in the node group in a sequence based on a metric. For example, the example node sorter 214 may sort the nodes by lowest distance to highest distance. At block 1308, the example candidate identifier 210 applies candidate limitations to the node group to identify one or more optimization candidates in the node group. For example, the example limitations tester 216 may apply candidate limitations 222 to the node group. In some such examples, one or more subsets of the node group may qualify as optimization candidates based on, for example, the first n nodes where the distance of the nth node is less than or equal to a threshold (e.g., two vector operations).

At block 1310, the example candidate identifier 210 verifies the contention of the nodes in the candidate. For example, the candidate verifier 220 may perform a dependencies test to determine whether an intervening write/store operation was executed on the memory addresses accessed by the nodes. If, at block 1312, the candidate verifier 220 determined that the candidate did not satisfy the dependencies test, then, at block 1314, the candidate verifier 220 discards the candidate. If, at block 1312, the candidate verifier 220 determined that the candidate did satisfy the dependencies test, then, at block 1316, the candidate verifier 220 records the candidate in the candidates database 218. In some examples, the candidate verifier 220 marks the candidate in the candidates database 218 to indicate that the candidate did satisfy the dependencies test. The example program 1300 of FIG. 13 then ends.

Figure 14:
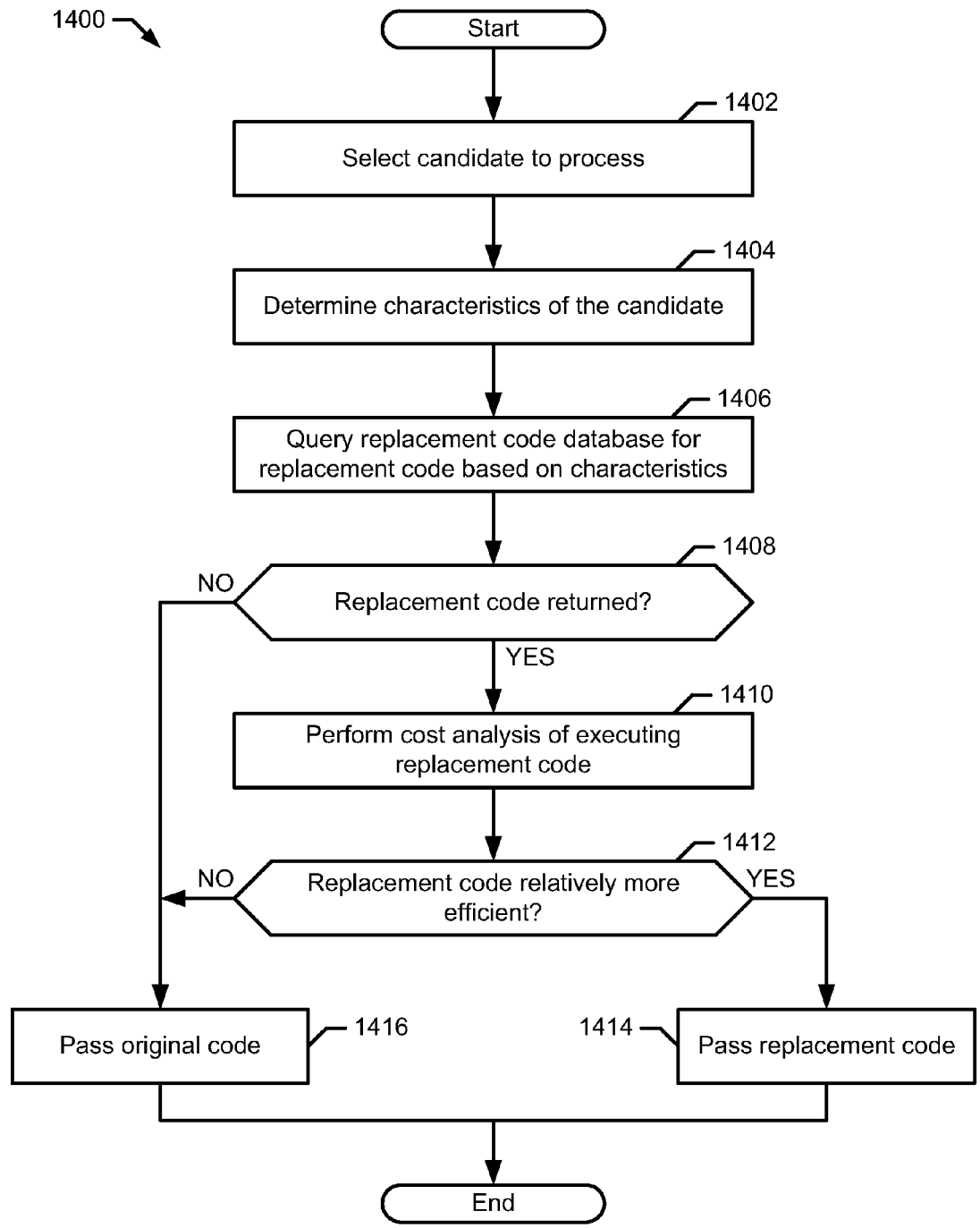
FIG. 14 is a flow chart representative of example machine-readable instructions that may be executed to generate replacement code for a replacement candidate.

FIG. 14 is a flowchart representative of example machine-readable instructions 1400 that may be executed by the example code optimizer 226 of FIG. 2 to provide replacement code for execution instead of the vector operations of a candidate. The example process 1400 of the illustrated example of FIG. 14 begins at block 1402 when the example code optimizer 226 selects a candidate to process. For example, the code optimizer 226 may query the example candidates database 218 for an unprocessed candidate. At block 1404, the example code optimizer 226 determines the characteristics of the candidate. For example, the characteristics handler 228 may identify the vector load type, the data type and/or the vector size of the nodes in the replacement candidate and/or the machine code processor architecture being used to compile the source code 120.

At block 1406, the example characteristics handler 228 uses the determined characteristics of the candidate to query the replacement code database 230 for replacement code. At block 1408, the example characteristics handler 228 determines whether the replacement code database 230 returned replacement code in response to the query. For example, the characteristics of the candidate may map to replacement code or may map to replacement code that is not available (e.g., "N/A," null, etc.). If, at block 1408, the example characteristics handler 228 determined that the replacement code database 230 returned replacement code, then, at block 1410, the example code optimizer 226 performs a cost analysis of executing the replacement code instead of the candidate 224. For example, the cost analyzer 236 may quantify the computing resources used to execute the replacement code (e.g., via a performance metric) and quantify the computing resources used to execute the original code (e.g., the nodes of the candidate).

At block 1412, the example code optimizer 226 determines whether executing the replacement code is relatively more efficient (e.g., more profitable and/or less costly to execute) than executing the vector operations of candidate. If, at block 1412, the example cost analyzer 236 determined that executing the replacement code is relatively more efficient, then, at block 1414, the code optimizer 216 passes the replacement code to the example code generator 135 to generate native and/or machine code (e.g., the example machine code 145) that may be executed by the example machine code processor 105 of FIG. 1. The example program 1400 of FIG. 14 then ends.

If, at block 1408, the example characteristics handler 228 determined that replacement code was not returned by the replacement code database 230, or if, at block 1412, the cost analyzer 236 determined that executing the replacement code would not be more efficient than executing the candidate, then, at block 1416, the example code optimizer 216 passes the candidate to the example code generator 135 to generate native and/or machine code (e.g., the example machine code 145) that may be executed by the example machine code processor 105. The example program 1400 of FIG. 14 then ends.

Figure 15:
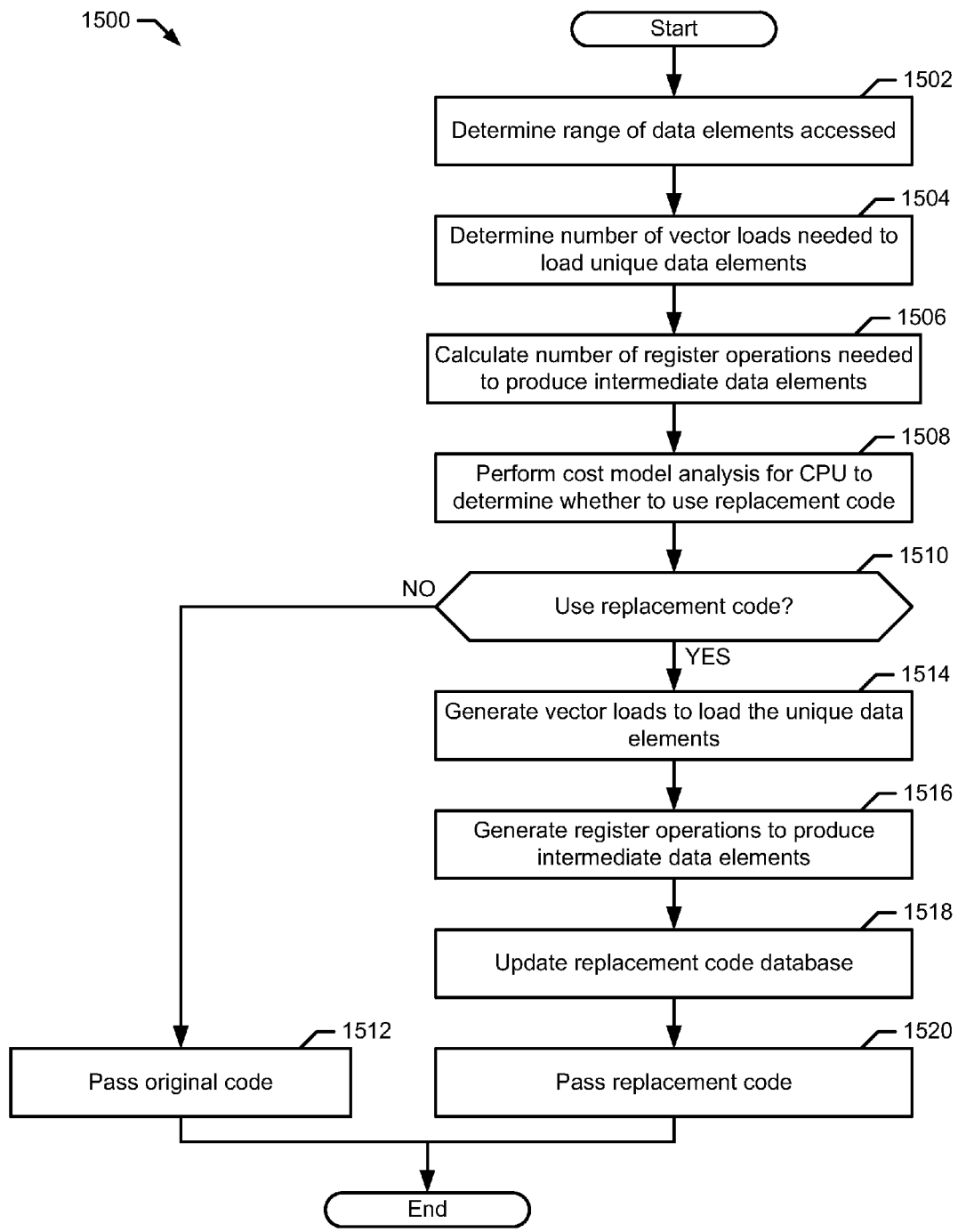
FIG. 15 is a flow chart representative of example machine-readable instructions that may be executed to generate replacement code for a replacement candidate.

FIG. 15 is a flowchart representative of example machine-readable instructions 1500 that may be executed by the example code optimizer 216 of FIG. 2 to generate replacement code for a candidate. The example code optimizer 216 may execute the example process 1500 in addition to or as an alternative to executing the example process 1400 of FIG. 14. The example process 1500 of the illustrated example of FIG. 15 begins at block 1502 when the example code optimizer 216 calculates a range of unique data elements accessed by the candidate. For example, the example range calculator 232 may parse the nodes of the candidate 224 and use the largest non-overlapping offset and/or distance from the base address (e.g., i+2) and the smallest non-overlapping offset and/or distance from the base address (e.g., i−2) to calculate the range of unique data elements. At block 1504, the example code optimizer 216 determines the number of vector load operations to execute to load the unique data elements with minimal redundancy. For example, the example operations calculator 234 may identify vector load operations from the candidate 224 to execute to load the unique data elements. At block 1506, the example operations calculator 234 determines the number of register operations (e.g., shift operations) that are needed to produce the overlapping data elements.

At block 1508, the example code optimizer 216 performs a cost model analysis for the machine code processor 105 to determine whether to replace the original code (e.g. the nodes of the candidate 224) or to use the original code. For example, the example cost analyzer 236 may use the machine code processor architecture, the number of vector loads in the original code, the number of vector loads needed to load the unique data elements, the number of register operations needed to load the overlapping data elements, the base address alignment, the port pressure in the current program (e.g., the source code 120 of FIG. 1), the register pressure in the current program spot, etc. If, at block 1510, the example cost analyzer 236 determines that executing replacement code would not be cost efficient compared to executing the candidate 224, then, at block 1512, the example cost analyzer 236 passes the original code (e.g., the vector operations of the candidate 224) to the example code generator 135. The example process 1500 of FIG. 15 then ends.

If, at block 1510, the example code analyzer 236 determined that executing replacement code would be more cost efficient than executing the candidate 224, then, at block 1514, the example replacement code generator 238 generates the vector load operations needed to load the unique data elements. At block 1516, the replacement code generator 238 generates the register operations needed to load the overlapping data elements. At block 1518, the example replacement code generator 238 updates the replacement code database 230 to include the generated replacement code. At block 1520, the code optimizer 226 passes the replacement code to the code generator 135. The example process 1500 of FIG. 15 then ends.

Figure 16:
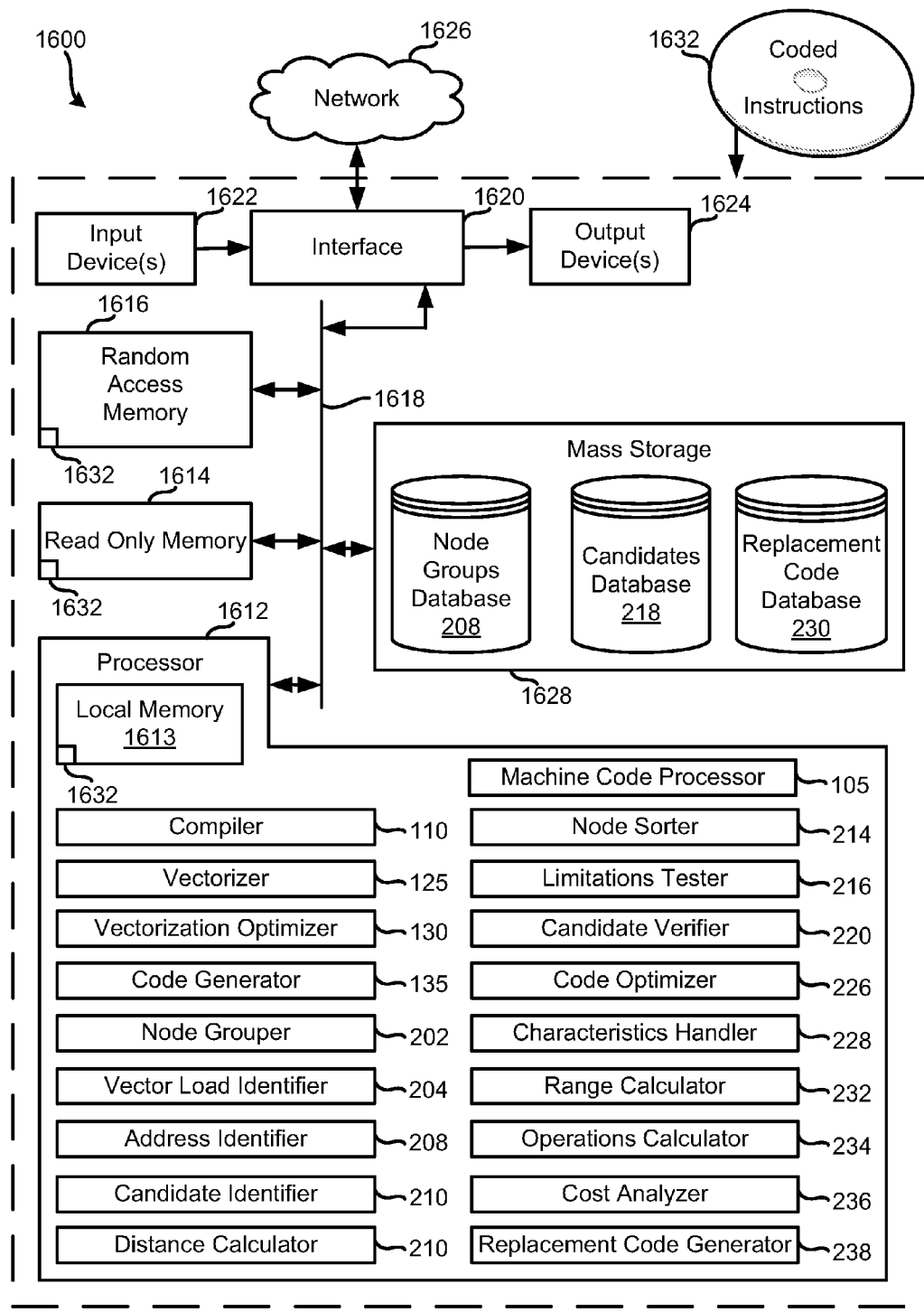
FIG. 16 is a block diagram of an example platform structured to execute the example machine-readable instructions of FIG. 10 to implement the example platform of FIG. 1 and/or execute the example machine-readable instructions of FIGS. 11-15 to implement the example vectorization optimizer of FIGS. 1 and/or 2.

FIG. 16 is a block diagram of an example processor platform 1600 capable of executing the instructions of FIGS. 10-15 to implement the example platform 100 of FIG. 1. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, and/or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache), and executes instructions to implement the example machine code processor 105, the example compiler 110, the example vectorizer 125, the example vectorization optimizer 130, the example code generator 135, the example node grouper 202, the example vector load identifier 204, the example address identifier 206, the example node groups database 208, the example candidate identifier 210, the example distance calculator 212, the example node sorter 214, the example limitations tester 216, the example candidates database 218, the example candidate verifier 220, the example code optimizer 226, the example characteristics handler 228, the example replacement code database 230, the example range calculator 232, the example operations calculator 234, the example cost analyzer 236, the example replacement code generator 238 and/or, more generally, the example platform 100. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard disk drives, compact disk drives, Blu-ray disk drives, RAID systems, and digital versatile disk (DVD) drives. The example mass storage device 1628 implements the example node groups database 208, the example candidates database 218 and the example replacement code database 230 of FIG. 2.

Coded instructions 1632 representative of the machine-readable instructions of FIGS. 10-15 may be stored in the mass storage device 1628, in the volatile memory 1614, in the non-volatile memory 1616, and/or on a removable tangible computer readable storage medium such as a CD or DVD.

The following examples identify additional example methods, apparatus, systems and/or articles of manufacture disclosed herein. An example disclosed method includes associating a vector operation with a node group based on a load type of the vector operation; identifying a candidate in the node group, the candidate including a subset of vector operations of the node group; determining replacement code based on a characteristic of the candidate; comparing an estimated cost associated with executing the replacement code to a threshold cost relative to a cost of executing the candidate; and based on the comparison, generating machine code using the replacement code when the estimated cost of executing the replacement code satisfies the threshold cost.

In some disclosed examples, the associating the vector operation with the node group further includes: parsing the vector operation to identify the load type of the vector operation; identifying the node group corresponding to the load type when the vector operation is a vector load operation; and updating the node group to include the vector operation.

In some disclosed examples, the method further includes creating the node group corresponding to the load type when the node group is not identified.

In some disclosed examples, the associating the vector operation with the node group further includes: parsing the vector operation to identify a base address of the vector operation; identifying the node group corresponding to the load type and the base address; and updating the node group to include the vector operation.

In some disclosed examples, the method further includes calculating a distance from a base address for the vector operation; ordering the node group based on the calculated distance of the vector operation relative to another vector operation in the node group; performing a dependencies test to a subset of the ordered node group; and selecting the subset of the ordered group when the subset satisfies the dependencies test to identify the candidate in the node group.

In some disclosed examples, the method further includes applying a candidate limitation to the ordered node group; and identifying the subset of the ordered based on the candidate limitation.

In some disclosed examples, the candidate limitation is a threshold number of vector operations.

In some disclosed examples, the candidate limitation is a threshold distance.

In some disclosed examples, the determining of the replacement code further includes querying a database for replacement code based on the characteristic of the candidate.

In some disclosed examples, the method further includes determining a number of vector load operations needed to load unique data elements of the candidate; calculating a number of register operations needed to produce overlapping data elements of the candidate; estimating a cost of executing replacement code based on the determined number of vector load operations and the calculated number of register operations; and generating the replacement code when the estimated cost satisfies the threshold cost of executing the candidate.

An example disclosed apparatus includes a node grouper to associate a vector operation with a node grouper based on a load type of the vector operation; a candidate identifier to identify a candidate in the node group, the candidate to include a subset of vector operations of the node group; a code optimizer to: determine replacement code based on a characteristic of the candidate; and compare an estimated cost associated with executing the replacement code to a threshold cost relative to a cost of executing the candidate; and a code generator to generate machine code using the replacement code when the estimated cost of executing the replacement code satisfies the threshold cost.

In some disclosed examples, the apparatus further includes a vector load identifier to parse the vector operation to identify the load type of the vector operation.

In some disclosed examples, the node grouper is to: identify the node group corresponding to the load type when the vector operation is a vector load operation; and update the node group to include the vector operation.

In some disclosed examples, the node grouper is to create the node group corresponding to the load type when the node group is not identified.

In some disclosed examples, the apparatus further includes an address identifier to parse the vector operation to identify a base address of the vector operation.

In some disclosed examples, the apparatus further includes: a distance calculator to calculate a distance from a base address for the vector operation; a node sorter to order the node group based on the calculated distance of the vector operation relative to another vector operation in the node group; and a candidate verifier to: perform a dependencies test to a subset of the ordered node group; and identify the subset of the ordered group as the candidate when the subset satisfies the dependencies test.

In some disclosed examples, the apparatus further includes a limitations tester to apply a candidate limitation to the ordered node group.

In some disclosed examples, the candidate identifier is to identify the subset of the ordered based on the candidate limitation.

In some disclosed examples, the candidate limitation is a threshold number of vector operations.

In some disclosed examples, the candidate limitation is a threshold distance.

In some disclosed examples, the apparatus further includes a characteristics handler to query a database for replacement code based on the characteristic of the candidate.

In some disclosed examples, the apparatus further includes an operations calculator to: determine a number of vector load operations needed to load unique data elements of the candidate; and calculate a number of register operations needed to produce overlapping data elements of the candidate; a cost analyzer to estimate a cost of executing replacement code based on the determined number of vector load operations and the calculated number of register operations; and a replacement code generator to generate the replacement code when the estimated cost satisfies the threshold cost of executing the candidate.

An example disclosed tangible computer readable storage medium comprises instructions that, when executed, cause a machine to at least associate a vector operation with a node group based on a load type of the vector operation; identify a candidate in the node group, the candidate to include a subset of vector operations of the node group; determine replacement code based on a characteristic of the candidate; compare an estimated cost associated with executing the replacement code to a threshold cost relative to a cost of executing the candidate; and generate machine code using the replacement code when the estimated cost of executing the replacement code satisfies the threshold cost.

In some disclosed examples, the instructions, when executed, cause the machine to associate the vector operation with the node group further by: parsing the vector operation to identify the load type of the vector operation; identifying the node group corresponding to the load type when the vector operation is a vector load operation; and updating the node group to include the vector operation.

In some disclosed examples, the instructions, when executed, cause the machine to create the node group corresponding to the load type when the node group is not identified.

In some disclosed examples, the instructions, when executed, cause the machine to associate the vector operation with the node group by: parsing the vector operation to identify a base address of the vector operation; identifying the node group corresponding to the load type and the base address; and updating the node group to include the vector operation.

In some disclosed examples, the instructions, when executed, cause the machine to calculate a distance from a base address for the vector operation; to order the node group based on the calculated distance of the vector operation relative to another vector operation in the node group; to perform a dependencies test to a subset of the ordered node group; and to select the subset of the ordered group when the subset satisfies the dependencies test to identify the candidate in the node group.

In some disclosed examples, the instructions, when executed, cause the machine to apply a candidate limitation to the ordered node group; and to identify the subset of the ordered based on the candidate limitation.

In some disclosed examples, the instructions, when executed, cause the machine to determine the replacement code by querying a database for replacement code based on the characteristic of the candidate.

In some disclosed examples, the instructions, when executed, cause the machine to determine a number of vector load operations needed to load unique data elements of the candidate; to calculate a number of register operations needed to produce overlapping data elements of the candidate; to estimate a cost of executing replacement code based on the determined number of vector load operations and the calculated number of register operations; and to generate the replacement code when the estimated cost satisfies the threshold cost of executing the candidate.

An example vectorization optimizer includes means for associating a vector operation with a node group based on a load type of the vector operation; means for identifying a candidate in the node group, the candidate including a subset of vector operations of the node group; means for determining replacement code based on a characteristic of the candidate; means for comparing an estimated cost associated with executing the replacement code to a threshold cost relative to a cost of executing the candidate; and means for based on the comparison, generating machine code using the replacement code when the estimated cost of executing the replacement code satisfies the threshold cost.

In some disclosed examples, the means for associating the vector operation with the node group is to: parse the vector operation to identify the load type of the vector operation; identify the node group corresponding to the load type when the vector operation is a vector load operation; and update the node group to include the vector operation.

In some disclosed examples, the vectorization optimizer further includes means for creating the node group corresponding to the load type when the node group is not identified.

In some disclosed examples, the means for associating the vector operation with the node group is to: parse the vector operation to identify a base address of the vector operation; identify the node group corresponding to the load type and the base address; and update the node group to include the vector operation.

In some disclosed examples, the vectorization optimizer further includes means for calculating a distance from a base address for the vector operation; means for ordering the node group based on the calculated distance of the vector operation relative to another vector operation in the node group; means for performing a dependencies test to a subset of the ordered node group; and means for selecting the subset of the ordered group when the subset satisfies the dependencies test to identify the candidate in the node group.

In some disclosed examples, the vectorization optimizer further includes means for applying a candidate limitation to the ordered node group; and means for identifying the subset of the ordered based on the candidate limitation.

In some disclosed examples, the means for determining the replacement code is to query a database for replacement code based on the characteristic of the candidate.

In some disclosed examples, the vectorization optimizer further includes means for determining a number of vector load operations needed to load unique data elements of the candidate; means for calculating a number of register operations needed to produce overlapping data elements of the candidate; means for estimating a cost of executing replacement code based on the determined number of vector load operations and the calculated number of register operations; and means for generating the replacement code when the estimated cost satisfies the threshold cost of executing the candidate.

From the foregoing, it will be appreciated that the above disclosed methods, apparatus and articles of manufacture enable replacing less cost efficient memory access operations with relatively more cost efficient vector operations. Examples disclosed herein operate based on detecting a group of vector load operations of the same load type and that share a base address, determining if the group of vector load operations is a candidate for replacement with relatively more cost efficient vector operations, and providing replacement code when executing the candidate is relatively less efficient than executing replacement code. An example advantage of examples disclosed herein is that the number of executed memory access operations is reduced and, thereby, the efficiency of the compiler is not bounded by the memory related bottlenecks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to eliminate partial-redundant vector load operations, the apparatus comprising:
    a processor; and
    memory, the memory to store computer program instructions, the computer program instructions when executed by the processor cause the processor to perform operations comprising:
    a node grouper to associate a vector operation with a node group based on a load type of the vector operation;
    a candidate identifier to identify a candidate in the node group, the candidate to include a subset of vector operations of the node group;
    a code optimizer to:
        determine replacement code based on a characteristic of the candidate; and
        compare an estimated cost associated with executing the replacement code to a threshold cost relative to a cost of executing the candidate;
    a code generator to generate machine code using the replacement code when the estimated cost of executing the replacement code satisfies the threshold cost;
    a distance calculator to calculate a distance from a base address for the vector operation;
    a node sorter to order the node group based on the calculated distance of the vector operation relative to another vector operation in the node group; and
    a candidate verifier to:
        perform a dependencies test to a subset of the ordered node group; and
        identify the subset of the ordered group as the candidate when the subset satisfies the dependencies test.

2. An apparatus as defined in claim 1 further including a limitations tester to apply a candidate limitation to the ordered node group.

3. An apparatus as defined in claim 1 further including a characteristics handler to query a database for replacement code based on a characteristic of the candidate.

4. An apparatus as defined in claim 1 further including:
    an operations calculator to:
        determine a number of vector load operations needed to load unique data elements of the candidate; and
        calculate a number of register operations needed to produce overlapping data elements of the candidate;
    a cost analyzer to estimate a cost of executing replacement code based on the determined number of vector load operations and the calculated number of register operations; and
    a replacement code generator to generate the replacement code when the estimated cost satisfies the threshold cost of executing the candidate.

5. An apparatus as defined in claim 1 further including a vector type identifier to parse the vector operation to identify the vector type of the vector operation.

6. An apparatus as defined in claim 5, wherein the node grouper is to create the node group corresponding to the vector type when the node group is not identified.

7. A method for eliminating partial-redundant vector load operations, the method comprising:
    associating a vector operation with a node group based on a load type of the vector operation;
    identifying a candidate in the node group, the candidate including a subset of vector operations of the node group;
    determining replacement code based on a characteristic of the candidate;
    comparing an estimated cost associated with executing the replacement code to a threshold cost relative to a cost of executing the candidate;
    based on the comparison, generating machine code using the replacement code when the estimated cost of executing the replacement code satisfies the threshold cost;
    parsing the vector operation to identify the load type of the vector operation;
    identifying the node group corresponding to the load type when the vector operation is a vector load operation; and
    updating the node group to include the vector operation.

8. A method as defined in claim 7, wherein determining the replacement code further includes querying a database for replacement code based on a characteristic of the candidate.

9. A method as defined in claim 7 further including:
determining a number of vector load operations needed to load unique data elements of the candidate;
calculating a number of register operations needed to produce overlapping data elements of the candidate;
estimating a cost of executing replacement code based on the determined number of vector load operations and the calculated number of register operations; and
generating the replacement code when the estimated cost satisfies the threshold cost of executing the candidate.

10. A method for eliminating partial-redundant vector load operations, the method comprising:
associating a vector operation with a node group based on a load type of the vector operation;
identifying a candidate in the node group, the candidate including a subset of vector operations of the node group;
determining replacement code based on a characteristic of the candidate;
comparing an estimated cost associated with executing the replacement code to a threshold cost relative to a cost of executing the candidate;
based on the comparison, generating machine code using the replacement code when the estimated cost of executing the replacement code satisfies the threshold cost;
parsing the vector operation to identify a base address of the vector operation;
identifying the node group corresponding to the load type and the base address; and
updating the node group to include the vector operation.

11. A method for eliminating partial-redundant vector load operations, the method comprising:
associating a vector operation with a node group based on a load type of the vector operation;
identifying a candidate in the node group, the candidate including a subset of vector operations of the node group;
determining replacement code based on a number of vector operations of the candidate;
comparing an estimated cost associated with executing the replacement code to a threshold cost relative to a cost of executing the candidate;
based on the comparison, generating machine code using the replacement code when the estimated cost of executing the replacement code satisfies the threshold cost;
calculating a distance from a base address for the vector operation;
ordering the node group based on the calculated distance of the vector operation relative to another vector operation in the node group;
performing a dependencies test to a subset of the ordered node group; and
selecting the subset of the ordered group when the subset satisfies the dependencies test to identify the candidate in the node group.

12. A method as defined in claim 11 further including:
applying a candidate limitation to the ordered node group; and
identifying the subset of the ordered based on the candidate limitation.

13. At least one tangible computer readable storage medium comprising instructions that, when executed, cause a machine to at least:
associate a vector operation with a node group based on a load type of the vector operation;
identify a candidate in the node group, the candidate to include a subset of vector operations of the node group;
determine replacement code based on a characteristic of the candidate;
compare an estimated cost associated with executing the replacement code to a threshold cost relative to a cost of executing the candidate;
generate machine code using the replacement code when the estimated cost of executing the replacement code satisfies the threshold cost;
parsing the vector operation to identify the load type of the vector operation;
identifying the node group corresponding to the load type when the vector operation is a vector load operation; and
updating the node group to include the vector operation.

14. At least one computer readable storage medium as defined in claim 13, wherein the instructions, when executed, cause the machine to create the node group corresponding to the load type when the node group is not identified.

15. At least one tangible storage medium as defined in claim 13, wherein the instructions, when executed, cause the machine to determine the replacement code by querying a database for replacement code based on the characteristic of the candidate.

16. At least one tangible storage medium as defined in claim 13, wherein the instructions, when executed, cause the machine to:
determine a number of vector load operations needed to load unique data elements of the candidate;
calculate a number of register operations needed to produce overlapping data elements of the candidate;
estimate a cost of executing replacement code based on the determined number of vector load operations and the calculated number of register operations; and
generate the replacement code when the estimated cost satisfies the threshold cost of executing the candidate.

17. At least one tangible computer readable storage medium comprising instructions that, when executed, cause a machine to at least:
associate a vector operation with a node group based on a load type of the vector operation;
identify a candidate in the node group, the candidate to include a subset of vector operations of the node group;
determine replacement code based on a characteristic of the candidate;
compare an estimated cost associated with executing the replacement code to a threshold cost relative to a cost of executing the candidate;
generate machine code using the replacement code when the estimated cost of executing the replacement code satisfies the threshold cost;
parsing the vector operation to identify a base address of the vector operation;
identifying the node group corresponding to the load type and the base address; and
updating the node group to include the vector operation.

18. At least one tangible computer readable storage medium comprising instructions that, when executed, cause a machine to at least:
associate a vector operation with a node group based on a load type of the vector operation;
identify a candidate in the node group, the candidate to include a subset of vector operations of the node group;
determine replacement code based on a characteristic of the candidate;

compare an estimated cost associated with executing the replacement code to a threshold cost relative to a cost of executing the candidate;
generate machine code using the replacement code when the estimated cost of executing the replacement code satisfies the threshold cost;
calculate a distance from a base address for the vector operation;
order the node group based on the calculated distance of the vector operation relative to another vector operation in the node group;
perform a dependencies test to a subset of the ordered node group; and
select the subset of the ordered group when the subset satisfies the dependencies test to identify the candidate in the node group.

* * * * *